United States Patent
Yamana et al.

(10) Patent No.: US 9,661,569 B2
(45) Date of Patent: May 23, 2017

(54) WIRELESS NETWORK CONTROL SYSTEM TO PERFORM ON-OFF CONTROL FOR SMALL CELL

(71) Applicant: FUJITSU LIMITED, Kawasaki-shi, Kanagawa (JP)

(72) Inventors: Takeshi Yamana, Yokohama (JP); Daisuke Inagaki, Yokohama (JP); Nobuyuki Arai, Yokohama (JP); Norio Ohki, Kawasaki (JP); Hisatake Do, Kawasaki (JP); Naoya Yamazaki, Yokohama (JP); Kiyoshi Komatsu, Yokohama (JP); Kiyofumi Hara, Yokohama (JP); Kazutoshi Kawamura, Chigasaki (JP); Hiroyuki Ohhashi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 97 days.

(21) Appl. No.: 14/742,942

(22) Filed: Jun. 18, 2015

(65) Prior Publication Data

US 2015/0373641 A1  Dec. 24, 2015

(30) Foreign Application Priority Data

Jun. 19, 2014  (JP) .................. 2014-126548

(51) Int. Cl.
*H04B 7/00* (2006.01)
*H04W 52/02* (2009.01)
(Continued)

(52) U.S. Cl.
CPC ....... *H04W 52/0206* (2013.01); *H04W 24/02* (2013.01); *H04W 16/08* (2013.01);
(Continued)

(58) Field of Classification Search
CPC ..... H04W 16/24; H04W 16/30; H04W 16/32; H04W 28/16
(Continued)

(56) References Cited

U.S. PATENT DOCUMENTS 4,144,411 A  3/1979  Frenkiel
8,295,874 B2 * 10/2012  Harris ................. H04W 52/287
                                                    370/310
(Continued)

FOREIGN PATENT DOCUMENTS

JP  53-039807  4/1978
JP  62-059940  12/1987
(Continued)

*Primary Examiner* — Dmitry H Levitan
(74) *Attorney, Agent, or Firm* — Fujitsu Patent Center

(57) ABSTRACT

A wireless network control system includes a macrocell base station configured to form a macrocell, at least one small cell base station configured to form a small cell disposed within the macrocell, and a control apparatus including a controller configured to execute a process of acquiring a first value indicating a traffic state of a wireless terminal using the macrocell and a second value indicating a traffic state of a wireless terminal using the small cell, and a process of setting OFF the small cell when an added value of the first value and the second value falls within a predetermined range related to the macrocell.

10 Claims, 36 Drawing Sheets

(51) Int. Cl.
*H04W 24/02* (2009.01)
*H04W 16/32* (2009.01)
*H04W 16/08* (2009.01)
*H04W 36/22* (2009.01)
*H04W 84/04* (2009.01)

(52) U.S. Cl.
CPC ............ *H04W 16/32* (2013.01); *H04W 36/22* (2013.01); *H04W 84/045* (2013.01); *Y02B 60/50* (2013.01)

(58) Field of Classification Search
USPC .......................... 370/310, 328, 329, 341, 349
See application file for complete search history.

(56) References Cited

U.S. PATENT DOCUMENTS

| | | | | |
|---|---|---|---|---|
| 8,676,215 | B2* | 3/2014 | Zou | H04W 52/146 |
| | | | | 370/338 |
| 8,843,139 | B2* | 9/2014 | Yu | H04W 48/16 |
| | | | | 370/338 |
| 2013/0235778 | A1* | 9/2013 | Maeder | H04W 52/0206 |
| | | | | 370/311 |
| 2014/0314000 | A1* | 10/2014 | Liu | H04W 72/042 |
| | | | | 370/329 |
| 2015/0223135 | A1* | 8/2015 | Ratasuk | H04W 16/32 |
| | | | | 455/436 |
| 2015/0223245 | A1* | 8/2015 | Cheng | H04W 48/16 |
| | | | | 370/329 |
| 2015/0271738 | A1* | 9/2015 | Cheng | H04W 16/24 |
| | | | | 455/422.1 |
| 2016/0044514 | A1* | 2/2016 | Acharya | H04W 24/02 |
| | | | | 370/328 |

FOREIGN PATENT DOCUMENTS

| | | |
|---|---|---|
| JP | 7-123153 | 5/1995 |
| JP | 10-336727 | 12/1998 |
| JP | 2002-111912 | 4/2002 |
| JP | 2003-037555 | 2/2003 |
| JP | 2010-212998 | 9/2010 |
| WO | 2010/110187 | 9/2010 |

\* cited by examiner

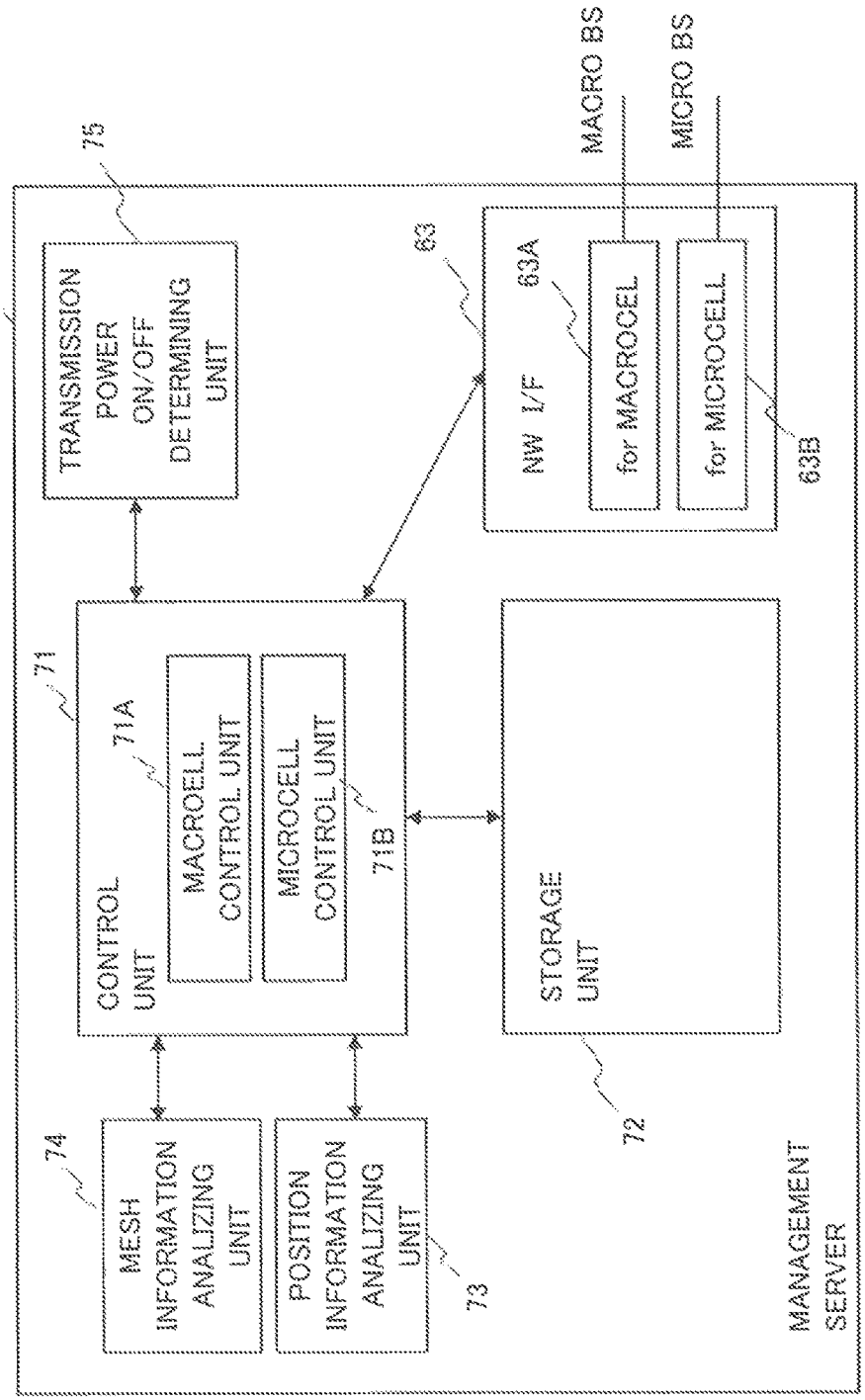

FIG. 10A

| MESH | 1 | 2 | 3 | 4 | 5 | 6 | 7 | 8 | 9 | 10 | 11 | 12 | 13 |
|---|---|---|---|---|---|---|---|---|---|---|---|---|---|
| 1 | 0101 | 0102 | 0103 | 0104 | 0105 | 0106 | 0107 | 0108 | 0109 | 0110 | 0111 | 0112 | 0113 |
| 2 | 0201 | 0202 | 0203 | 0204 | 0205 | 0206 | 0207 | 0208 | 0209 | 0210 | 0211 | 0212 | 0213 |
| 3 | 0301 | 0302 | 0303 | 0304 | 0305 | 0306 | 0307 | 0308 | 0309 | 0310 | 0311 | 0312 | 0313 |
| 4 | 0401 | 0402 | 0403 | 0404 | 0405 | 0406 | 0407 | 0408 | 0409 | 0410 | 0411 | 0412 | 0413 |
| 5 | 0501 | 0502 | 0503 | 0504 | 0505 | 0506 | 0507 | 0508 | 0509 | 0510 | 0511 | 0512 | 0513 |
| 6 | 0601 | 0602 | 0603 | 0604 | 0605 | 0606 | 0607 | 0608 | 0609 | 0610 | 0611 | 0612 | 0613 |
| 7 | 0701 | 0702 | 0703 | 0704 | 0705 | 0706 | 0707 | 0708 | 0709 | 0710 | 0711 | 0712 | 0713 |
| 8 | 0801 | 0802 | 0803 | 0804 | 0805 | 0806 | 0807 | 0808 | 0809 | 0810 | 0811 | 0812 | 0813 |
| 9 | 0901 | 0902 | 0903 | 0904 | 0905 | 0906 | 0907 | 0908 | 0909 | 0910 | 0911 | 0912 | 0913 |
| 10 | 1001 | 1002 | 1003 | 1004 | 1005 | 1006 | 1007 | 1008 | 1009 | 1010 | 1011 | 1012 | 1013 |
| 11 | 1101 | 1102 | 1103 | 1104 | 1105 | 1106 | 1107 | 1108 | 1109 | 1110 | 1111 | 1112 | 1113 |
| 12 | 1201 | 1202 | 1203 | 1204 | 1205 | 1206 | 1207 | 1208 | 1209 | 1210 | 1211 | 1212 | 1213 |
| 13 | 1301 | 1302 | 1303 | 1304 | 1305 | 1306 | 1307 | 1308 | 1309 | 1310 | 1311 | 1312 | 1313 |

TRAFFIC INFORMATION MANAGEMENT TABLE ~80

| NAME OF CELL | DATA FLOW RATE(Mbit/sec) | THE NUMBER OF USERS IN SERVICE |
|---|---|---|
| M-1-1 | 80 | 100 |
| μ-1 | 20.3 | 2 |
| μ-2 | 18.2 | 3 |
| μ-3 | 7.8 | 1 |
| μ-4 | 3.2 | 1 |
| μ-5 | 2.2 | 2 |
| μ-6 | 0.2 | 1 |
| μ-7 | 0 | 0 |
| μ-8 | 0 | 0 |
| μ-9 | 14.6 | 4 |
| μ-10 | 2.7 | 1 |
| μ-11 | 0 | 0 |
| μ-12 | 0.7 | 1 |
| ... | ... | ... |

FIG. 12

TRAFFIC INFORMATION RECORD

| CELL NAME | DATA FLOW RATE (Mbit/sec) | THE NUMBER OF USERS IN SERVICE |
|---|---|---|
| C | D | U |

FIG. 13

MESH CODE-MACROCELL/MICROCELL ASSOCIATIVE TABLE
~81

| MESH CODE | CORRESPONDING MACROCELL | CORRESPONDING MICROCELL | CORRESPONDING MICROCELL 2 | CORRESPONDING MICROCELL x |
|---|---|---|---|---|
| 204 | M-1 | μ-1 | ... | ... |
| 205 | M-1 | μ-1 | ... | ... |
| 206 | M-1 | μ-2 | ... | ... |
| 207 | M-1 | μ-2 | ... | ... |
| 208 | M-1 | μ-3 | μ-1 | ... |
| 209 | M-1 | μ-3 | ... | ... |
| 304 | M-1 | μ-1 | ... | ... |
| 305 | M-1 | μ-1 | ... | ... |
| 306 | M-1 | μ-2 | ... | ... |
| 307 | M-1 | μ-2 | ... | ... |
| 308 | M-1 | μ-3 | ... | ... |
| 603 | M-1 | μ-4 | μ-8 | ... |

FIG. 14

MACROCELL/MICROCELL-MESH CODE ASSOCIATIVE TABLE 82

| CELL NAME | CORRES-PONDING MESH CODE | CORRES-PONDING MESH CODE | CORRES-PONDING MESH CODE | CORRES-PONDING MESH CODE | CORRES-PONDING MESH CODE | CORRES-PONDING MESH CODE |
|---|---|---|---|---|---|---|
| M-1-1 | | | | | | |
| μ-1 | 0204 | 0205 | 0206 | 0207 | 0208 | ... |
| μ-2 | 0204 | 0205 | 0304 | 0305 | ... | ... |
| μ-3 | 0206 | 0207 | 0306 | 0307 | ... | ... |
| μ-4 | 0208 | 0209 | 0308 | 0309 | ... | ... |
| μ-5 | 0403 | 0404 | 0503 | 0603 | ... | ... |
| μ-6 | 0405 | 0406 | 0505 | 0506 | ... | ... |
| μ-7 | 0407 | 0408 | 0507 | 0508 | ... | ... |
| μ-8 | 0409 | 0410 | 0509 | 0510 | ... | ... |
| μ-9 | 0603 | 0604 | 0703 | 0704 | ... | ... |
| μ-10 | 0605 | 0606 | 0705 | 0706 | ... | ... |
| | 0607 | 0608 | 0707 | 0708 | ... | ... |

FIG. 15

MESH CODE-USER MANAGEMENT TABLE 83

| MESH CODE | THE NUMBER OF USERS | USER IDENTIFIER |
|---|---|---|
| 0204 | 0 | |
| 0205 | 2 | |
| 0206 | 6 | |
| 0207 | 5 | |
| 0208 | 8 | |
| 0209 | 2 | |
| 0304 | 1 | |
| 0305 | 0 | |
| 0306 | 4 | |
| 0307 | 11 | |
| 0308 | 0 | |
| 0309 | 3 | |

FIG. 16

USER INFORMATION MANAGEMENT TABLE ~84

| USER IDENTIFIER | DATA FLOW RATE (Mbit/sec) | POSITION INFORMATION (LATITUDE, LONGITUDE) | |
|---|---|---|---|
| 0073778299910023 | 11.2 | 33.3572111 | 133.2519999 |
| 9876543210998765 | 2.3 | 33.35722222 | 133.2518888 |
| 1122334455667788 | 0 | 33.35723333 | 133.2517777 |
| 0102030405067070 | 0 | 33.35724444 | 133.2516666 |
| 0102030405067071 | 1.1 | 33.35725555 | 133.2515555 |
| 0102030405067072 | 0.5 | 33.35726666 | 133.2514444 |
| 0102030405067073 | 4.6 | 33.35727777 | 133.2513333 |
| 0102030405067074 | 3.2 | 33.35728888 | 133.2512222 |
| 0102030405067075 | 10.4 | 33.35729999 | 133.2511111 |
| 0102030405067076 | 2.8 | 33.3573111 | 133.251 |
| 0102030405067077 | 0 | 33.35732221 | 133.2508889 |
| 0102030405067078 | 0 | 33.35733332 | 133.2507778 |

FIG. 17

USER INFORMATION RECORD

| USER INDENTIFIER | DATA FLOW RATE | POSITION INFORMATION (LATITUDE) | POSITION INFORMATION (LONGITUDE) |
|---|---|---|---|
| UI | DU | LA | LO |

FIG. 18

THRESHOLD MANAGEMENT TABLE — 85

| INVARIABLE DATA | UNIT | EXAMPLE | HOLDER |
|---|---|---|---|
| UPPER LIMIT SHRESHOLD OF DATA FLOW RATE IN MACROCELL | Mbit/sec | 800 | MANAGEMENT SERVER |
| UPPER LIMIT SHRESHOLD OF DATA FLOW RATE IN MACROCELL | Mbit/sec | 200 | MANAGEMENT SERVER |
| UPPER LIMIT SHRESHOLD THE NUMBER OF USERS CONNECTABLE TO MACROCELL | PERSON | 100 | MANAGEMENT SERVER |
| LOWER LIMIT SHRESHOLD OF THE NUMBER OF USERS CONNECTABLE TO MACROCELL | PERSON | 20 | MANAGEMENT SERVER, TERMINAL |
| UPPER LIMIT SHRESHOLD OF DATA FLOW RATE IN MICROCELL | Mbit/sec | 80 | MANAGEMENT SERVER, TERMINAL |
| LOWER LIMIT SHRESHOLD OF DATA FLOW RATE IN MICROCELL | Mbit/sec | 20 | MANAGEMENT SERVER, TERMINAL |
| UPPER LIMIT SHRESHOLD THE NUMBER OF USERS CONNECTABLE TO MICROCELL | PERSON | 10 | MANAGEMENT SERVER |
| LOWER LIMIT SHRESHOLD THE NUMBER OF USERS CONNECTABLE TO MACROCELL | PERSON | 2 | MANAGEMENT SERVER |

FIG. 19

SCHEDULE MANAGEMENT TABLE 86

| DETAMINATION PARAMETER | DATE | PERIOD OF TIME | MACROCELL HAVING INFLUENCE |
|---|---|---|---|
| CONCERT "aa" | 20131224 | 18:00-23:00 | M-1,M-2 |
| CLOSED TO TRAFFIC AT NIGHT | 20131130-20131231 | 22:00-06:00 | M-2,M-3 |
| OUTDOOR EVENT | 20131223 | 10:00-17:00 | M-4 |
| COMPETITION "bb" | 20140101 | 10:00-15:00 | M-1,M-3 |
| POST RECORDS | 20131224 | 19:00-20:00 | M-1 |
| : | : | : | : |

FIG. 20

MICROCELL ON/OFF MANAGEMENT TABLE ~87

| CELL NAME | TOTAL NUMBER OF USERS | STATUS | DATA FLOW RATE | CORRES-PONDING MESH CODE | THE NUMBER OF USERS | CORRES-PONDING MESH CODE | THE NUMBER OF USERS | CORRES-PONDING MESH CODE | THE NUMBER OF USERS | ... |
|---|---|---|---|---|---|---|---|---|---|---|
| $\mu$-1 | 0 | OFF | 0 | | | | | | | ... |
| $\mu$-2 | 3 | ON | 20M | 0206 | 1 | 0207 | 1 | 0307 | 1 | ... |
| $\mu$-3 | 0 | OFF | 0 | | | | | | | ... |
| $\mu$-4 | 2 | ON | 50M | 0403 | 1 | 0603 | 1 | | | ... |
| $\mu$-5 | 0 | OFF | 0 | | | | | | | ... |
| $\mu$-6 | 0 | OFF | 0 | | | | | | | ... |
| $\mu$-7 | 0 | OFF | 0 | | | | | | | ... |
| $\mu$-8 | 1 | OFF | 100M | 0603 | 1 | | | | | ... |
| $\mu$-9 | 0 | OFF | 0 | | | | | | | ... |
| $\mu$-10 | 0 | OFF | 0 | | | | | | | ... |
| ... | ... | ... | ... | ... | ... | ... | ... | ... | ... | ... |

FIG. 25

| CELL NAME | TOTAL NUMBER OF USERS | STATUS | DATA FLOW RATE | CORRES- PONDING MESH CODE | THE NUMBER OF USERS | CORRES- PONDING MESH CODE | THE NUMBER OF USERS | CORRES- PONDING MESH CODE | THE NUMBER OF USERS | ... |
|---|---|---|---|---|---|---|---|---|---|---|
| $\mu$-1 | 0 | OFF | 0 | | | | | | | ... |
| $\mu$-2 | 9 | OFF | 0 | 0306 | 3 | 0407 | 3 | 0507 | 3 | ... |
| $\mu$-3 | 0 | OFF | 0 | | | | | | | ... |
| $\mu$-4 | 9 | ON | 17M | 0403 | 1 | 0603 | 1 | | | ... |
| $\mu$-5 | 0 | OFF | 0 | | | | | | | ... |
| $\mu$-6 | 0 | OFF | 0 | | | | | | | ... |
| $\mu$-7 | 0 | OFF | 0 | | | | | | | ... |
| $\mu$-8 | 9 | ON | 15M | 0703 | 3 | 0603 | 3 | 0604 | 3 | ... |
| $\mu$-9 | 0 | OFF | 0 | | | | | | | ... |
| $\mu$-10 | 0 | OFF | 0 | | | | | | | ... |

FIG. 26

TRAFFIC INFORMATION MANAGEMENT TABLE

| CELL NAME | DATA FLOW RATE (Mbit/sec) | THE NUMBER OF USERS IN SERVICE |
|---|---|---|
| M-1-1 | 785 | 90 |

POWER ON 87

| CELL NAME | TOTAL NUMBER OF USERS | STATUS | DATA FLOW RATE | CORRES-PONDING MESH CODE | THE NUMBER OF USERS | CORRES-PONDING MESH CODE | THE NUMBER OF USERS | CORRES-PONDING MESH CODE | THE NUMBER OF USERS | ... |
|---|---|---|---|---|---|---|---|---|---|---|
| μ-2 | 3 | OFF | 20M | 0206 | 1 | 0207 | 1 | 0307 | 1 | ... |
| μ-4 | 2 | OFF | 50M | 0403 | 1 | 0603 | 1 | | | ... |
| μ-8 | 1 | OFF | 100M | 0603 | 1 | | | | | ... |
| μ-9 | 0 | OFF | 0 | | | | | | | ... |
| μ-10 | 0 | OFF | 0 | | | | | | | ... |
| ... | | | | | | | | | | |

FIG. 30

TRAFFIC INFORMATION MANAGEMENT TABLE

| CELL NAME | DATA FLOW RATE (Mbit/sec) | THE NUMBER OF USERS IN SERVICE |
|---|---|---|
| M-1-1 | 900 | 90 |

80

WIRELESS NETWORK CONTROL SYSTEM TO PERFORM ON-OFF CONTROL FOR SMALL CELL

CROSS-REFERENCE TO RELATED APPLICATION

This application is based upon and claims the benefit of priority of the prior Japanese Patent Application No. 2014-126548, filed on Jun. 19, 2014, the entire contents of which are incorporated herein by reference.

FIELD

Disclosure relates to a wireless network control system, a wireless network control apparatus and a wireless network control method.

BACKGROUND

A Heterogeneous Network (abbreviated to HetNet and also called "Heterogeneous Hybrid Network") is proposed as one of countermeasures against an increase of traffic in a network formed by a macrocell. The heterogeneous network is a network including a macrocell and one or a plurality of small cells disposed within the macrocell. With the small cells being disposed within the macrocell, it is feasible to increase a receivable user count and/or a network frequency band. The small cell includes a microcell, a picocell and a femtocell.

For further information, refer to Japanese Patent Laid-Open Publication No. 2003-037555, Japanese Patent Laid-Open Publication No. 2010-212998, International Publication WO2010/110187, Japanese Patent Laid-Open Publication No. H10-336727, Japanese Patent Laid-Open Publication No. 2002-111912, Japanese Patent Laid-Open Publication No. H07-123153 and Examine Patent Publication No. S62-059940.

The HetNet has a problem of causing a rise of total power consumption of small cell base stations with an increase of the number of small cells disposed within the macrocell. ON/OFF operations of each small cell are conducted manually in status quo. The operation of setting OFF an unnecessary small cell for reducing the power consumption entailed the operator's monitoring a state of using each small cell and setting OFF the small cell deemed unnecessary, and was therefore highly complicated.

It is assumed that a terminal in communication exists when the small cell deemed unnecessary is set OFF. The terminal attempts handing over to a base station forming the macrocell. The handover may be rejected depending on a traffic state of the macrocell at that time. As a result, the terminal is disabled from detecting the handover target cell, resulting in an interruption of the communication.

SUMMARY

According to an aspect of the embodiments, a wireless network control system includes a macrocell base station configured to form a macrocell, at least one small cell base station configured to form a small cell disposed within the macrocell, and a control apparatus including a controller configured to execute a process of acquiring a first value indicating a traffic state of a wireless terminal using the macrocell and a second value indicating a traffic state of a wireless terminal using the small cell, and a process of setting OFF the small cell when an added value of the first value and the second value falls within a predetermined range related to the macrocell.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is a block diagram schematically illustrating functions of the management server;

FIG. 10A is an explanatory diagram of a mesh;

FIG. 10B is an explanatory diagram schematically illustrating an associative relationship between the mesh, the macrocell and the microcell;

FIG. 11 is a diagram illustrating an example of a data structure of a traffic information management table (table 80) per base station;

FIG. 12 is a diagram illustrating one example of a format (traffic information record) of traffic information;

FIG. 13 is a diagram illustrating an example of a data structure of a mesh code-macrocell/microcell associative table (table 81);

FIG. 14 is a diagram illustrating an example of a data structure of a macrocell/microcell-mesh code associative table (table 82);

FIG. 15 is a diagram illustrating an example of a data structure of a mesh code-user management table (table 83);

FIG. 16 is a diagram illustrating an example of a data structure of a user information management table (table 84);

FIG. 17 is a diagram illustrating one example of a format (user information record) of user information received by a management server;

FIG. 18 is a diagram illustrating an example of a data structure of a threshold value management table (table 85);

FIG. 19 is a diagram illustrating an example of a data structure of a schedule management table (table 86);

FIG. 20 is a diagram illustrating an example of a data structure of a microcell ON/OFF management table 87;

FIG. 25 is a diagram illustrating an example of the microcell ON/OFF management table;

FIG. 26 is a diagram illustrating one example of a part (a record of the macrocell) of the traffic information management table per base station;

FIG. 29 is a diagram illustrating one example of the microcell ON/OFF management table;

FIG. 30 is a diagram illustrating one example of a part (a record of the macrocell) of the traffic information management table per base station;

DESCRIPTION OF EMBODIMENTS

An embodiment of the present invention will hereinafter be described with reference to the accompanying drawings. A configuration of the following embodiment is an exemplification, and the present invention is not limited to the configuration of the embodiment.

<Network Architecture>

Figure 1:
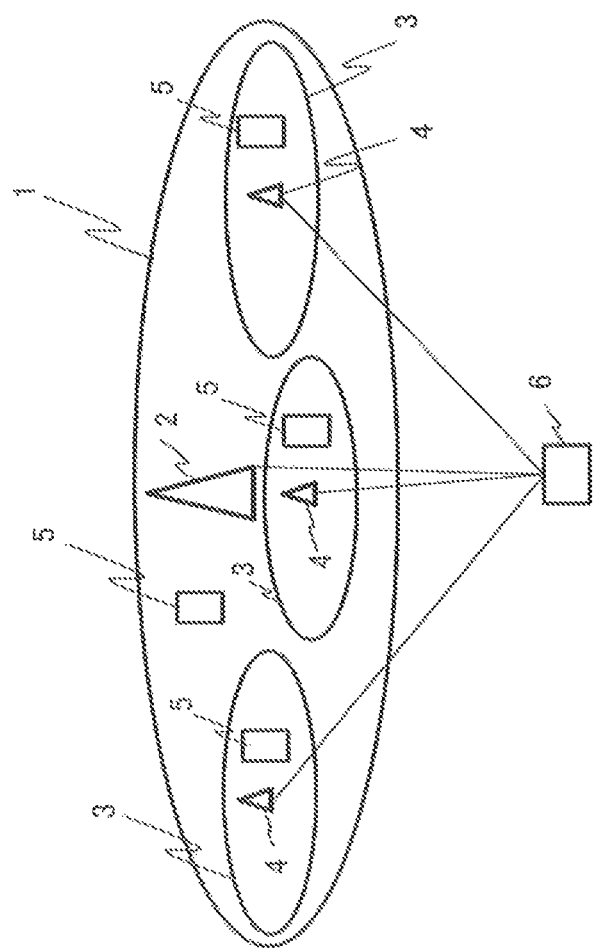
FIG. 1 is a diagram illustrating one example of a heterogeneous network according to an embodiment.
Figure 2:
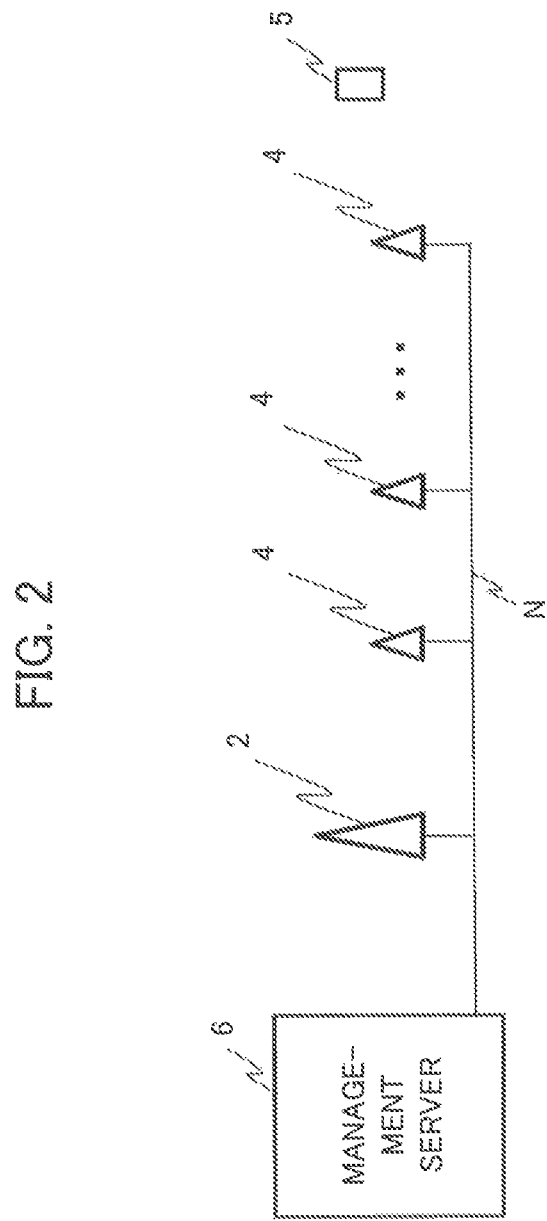
FIG. 2 is a diagram illustrating an example of architecture of the heterogeneous network.

FIG. 1 is a diagram illustrating one example of a heterogeneous network (which will hereinafter be abbreviated to "HetNet") according to the embodiment. FIG. 2 is a diagram illustrating an example of architecture of a HetNet system. In the example depicted in FIG. 1, the HetNet includes a macrocell base station 2 forming a macrocell 1 and an n-number ("n" is a natural number equal to or larger than 1) of macrocell base stations 4 each forming a microcell 3 having a size smaller than a size of the macrocell 1. A cell size encompasses, e.g., a cell radius.

The example depicted in FIG. 1 illustrates the three microcells 3 and the microcell base stations 4 each forming the microcell 3. The macrocell base station 2 and the microcell base stations 4 are interconnected via a X2 interface provided on an optical fiber or a metal line. The macrocell base station 2 and the microcell base stations 4 are thereby enabled to perform communications with each other. The macrocell base station 2 and each of the microcell base stations 4 radiate radio waves toward peripheral areas thereof and are thereby enabled to form an associative cell (the macrocell 1 or the microcell 3). According to ON/OFF of electric power (called transmission power) for radiating the radio waves to form the cells, each of the macrocell 1 and the microcell 3 is ON/OFF (to form or stop configuring).

The microcell 3 is one example of a "small cell". The microcell base station 4 is one example of a "small cell base station". The small cell includes the microcell, a picocell and a femtocell. The small cell base station includes the microcell base station to form the microcell, a picocell base station to form the picocell and a femtocell base station to form the femtocell. A part or the whole of the microcell 3 illustrated in FIG. 3 may be at least one of the picocell and the femtocell.

Note that the macrocell generally covers a communicable area ranging from, e.g., several hundreds of meters (m) to several tens of kilometers (km) in radius. The microcell covers a communicable area smaller than the macrocell on the unit of, e.g., several hundreds of meters in radius. The picocell covers a communicable area (equal to or greater than several tens of meters but no more than substantial one hundred meters in radius) smaller than the microcell. The femtocell covers a communicable area (equal to or lower than several tens of meters in radius) smaller than the picocell.

A wireless terminal (user) 5 may use both of the macrocell 1 and the microcell 3 (may camp on both of areas). To be specific, the wireless terminal 5 (simply termed "the terminal 5" hereinafter) connects to the macrocell 1 (the macrocell base station 2) in a coverage area of the macrocell 1, and may be provided with communication services via the macrocell 1. The terminal 5 connects to the microcell 3 (the microcell base station 4) within the coverage area of the microcell 3, and may be also provided with the communication services via the microcell 3.

The macrocell 1 and the microcell 3 use the same frequency or different frequencies enabling a handover (HO). The terminal 5 may hand over the base station between the macrocell 1 and the microcell 3. The terminal 5 may use both of the macrocell 1 and the microcell 3 (small cell). However, when the terminal 5 switches over the cell between the macrocell 1 and the microcell 3, such an operation may be taken that the terminal 5 reconnects to the cell without the handover.

Each microcell base station 4 forms the microcell 3 within the coverage area of the macrocell 1. The macrocell 1 covers a coverage area of the microcell 3. The macrocell 1 covers the respective microcells 3, whereby the terminal 5 (subordinate to the microcell base station 4) using the microcell 3 so far may continue receiving the communication services through the handover to the macrocell 1 even when the microcell 3 is set OFF (to stop configuring the cell itself).

Alternatively, the terminal 5 subordinate to the microcell 3 may hand over the base station to another microcell 3 existing in the periphery of (neighboring to) the present microcell 3. Thus, the HetNet according to the embodiment enables ON/OFF of the microcell 3 corresponding to a load (traffic state) of each of the macrocell base station 2 and the microcell base stations 4. Power consumption may be reduced by setting OFF the microcell 3.

The ON/OFF of the microcell 3 is attained by switching ON/OFF the transmission power for configuring the microcell 3 as described above. A power source of the microcell base station 4 may also be switched ON/OFF for the ON/OFF of the transmission power. With the former scheme being adopted, it is feasible to reduce an overhead at ON time of the microcell 3 by preventing the whole microcell base stations 4 from becoming the OFF status. However, standby power occurs. With the later scheme being adopted, the power consumption may be further reduced due to the standby power not being required. The embodiment will discuss an instance of setting ON/OFF the microcell 3 by switching ON/OFF the transmission power as one example.

As illustrated in FIG. 2, each of the macrocell base station 2 and the microcell base stations 4 is connected to a management server 6 (simply termed "the server 6" hereinafter) via a cable network N. A part of the cable network N may encompass a wireless section as the case may be. The server 6 receives a message containing information for controlling ON/OFF the microcell 3 from the macrocell base station 2 and each of the microcell base stations 4 via the cable network N. The server 6 may analyze the received information and transmit a message for instructing each microcell base station 4 to switch ON or OFF the transmission power. The server 6 is one example of "a control apparatus" and "a wireless network control apparatus".

The microcell base station 4 receiving a transmission power OFF message switches OFF the transmission power. Thereupon, each of the terminals 5 subordinate thereto attempts performing the handover to the neighboring cell (i.e., the macrocell 1 or another neighboring microcell 3) by searching the cells throughout because of a decrease of an intensity of the radio waves received from the microcell base station 4.

<Example of Configuration of Terminal>

Figure 3:
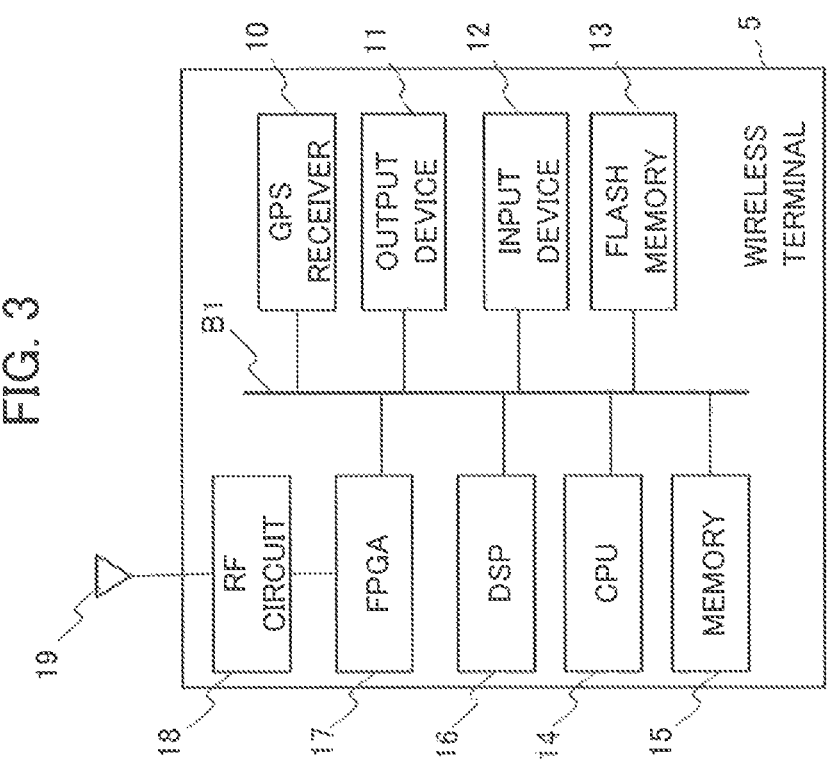
FIG. 3 is a diagram illustrating an example of a hardware configuration of a terminal (terminal apparatus)

FIG. 3 illustrates an example of a hardware configuration of the terminal (terminal apparatus) 5. The terminal 5 includes a Global Positioning System (GPS) receiver 10, an output device 11, an input device 12, a flash memory 13 and a Central Processing Unit (CPU) 14, which are interconnected via a bus B1. The terminal 5 further includes a memory 15, a Digital Signal Processor (DSP) 16, a Field Programmable Gate Array (FPGA) 17 and a Radio Frequency (RF) circuit 18.

The GPS receiver 10 calculates a position of the terminal 5 by receiving a signal from a GPS satellite, and outputs position information containing a calculated result.

The output device 11 may include a display device and a voice output device (speaker). A lamp and a vibrator may be included as the output device 11. The input device 12 includes at least one of a set of buttons, a set of keys and a touch panel, and a voice input device (microphone). The flash memory 13 is one example of an auxiliary storage device. The flash memory 13 stores a program executed by the DSP 16 and data used for executing the program. The auxiliary storage device includes, in addition to the flash memory, a Solid State Drive (SSD), a Hard Disc Drive (HDD), an Electrically Erasable Programmable Read-Only Memory (EEPROM), and so on.

The memory 15 is one example of a main storage device (main memory). The memory 15 includes, e.g., a Read Only Memory (ROM) and a Random Access Memory (RAM). The memory 15 is used as an operation area of the CPU 14. The CPU 14 loads a variety of programs (Operating System (OS), application programs, etc.) stored in the flash memory 13 into the memory 15, and executes the programs. These programs being executed, the CPU 14 implements functions for receiving a variety of communication services such as a call function, a Web terminal function and a mail function.

The DSP 16 operates as a BB processing unit to carry out a digital baseband (BB) process for user data. For example, the DSP 16 executes a process of digitally modulating the user data and control signals (control information) and thus converting the data and the signals into the baseband signals (BB signals), and a process of acquiring the user data and the control signals (control information) by executing a process of demodulating the BB signals received from the FPGA 17.

The FPGA 17 operates as an orthogonal modem unit to execute an orthogonal modulation/demodulation process as an analog BB process. To be specific, the FPGA 17 converts the BB signal into the analog signal by performing the orthogonal modulation process on the BB signal received from the DSP 16, and transmits the converted signal to the RF circuit 18. On the other hand, the FPGA 17 converts the analog signal into the BB signal by performing the orthogonal demodulation process on the analog signal received from the RF circuit 18, and transmits the converted signal to the DSP 16.

The RF circuit 18 manages the wireless processes in a downlink direction (base station→terminal 5) and an uplink direction (terminal 5→base station). The RF circuit 18 includes an up-converter and a power amplifier (PA) in the downlink direction. The RF circuit 18 includes a low-noise amplifier (LNA) and a down-converter in the uplink direction. The RF circuit 18 includes a duplexer as a component common to the downlink and the uplink. The duplexer is connected to a transmission/reception antenna 19.

The up-converter up-converts the analog signal (RF signal) received from the FPGA 17 into a frequency of the radio waves. The PA amplifies the up-converted signal. The duplexer connects the amplified signal to the transmission/reception antenna 19. The transmission/reception antenna 19 radiates the radio waves. The base stations (the macrocell base station 2 and the microcell base stations 4) receive the radiated radio waves.

The radio waves received by the base stations through the transmission/reception antenna 19 are inputted via the duplexer to and low-noise-amplified by the LNA. The low-noise-amplified signal is down-converted into a frequency of the analog signal (RF signal) by the down-converter. The down-converted signal is inputted to the FPGA 17.

The CPU 14 and the DSP 16 are one examples of "a processor", "a controller" and "a control unit". The flash memory 13 and the memory 15 are one examples of "a storage device", "a storage unit" and "a non-transitory computer readable storage medium".

Figure 4:
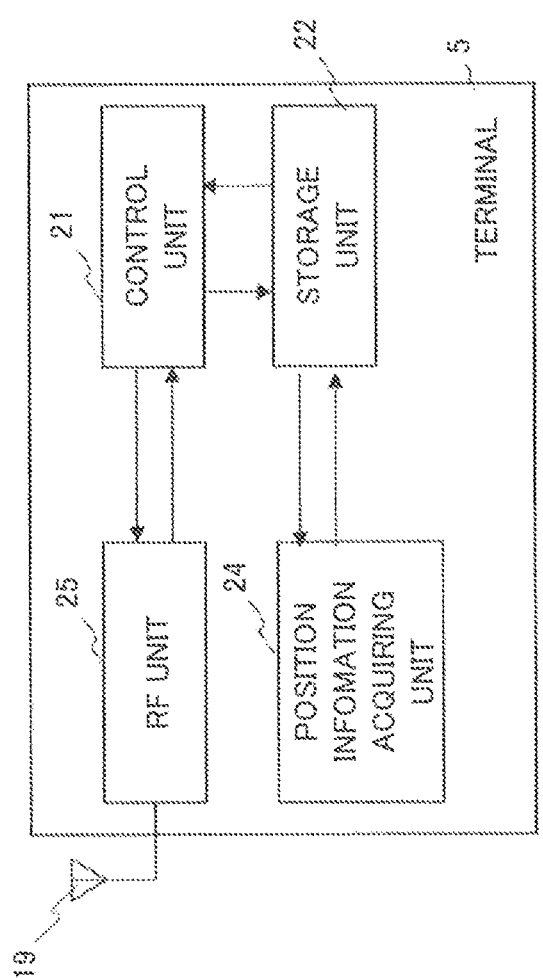
FIG. 4 is a block diagram schematically illustrating functions of the terminal.

FIG. 4 is a block diagram schematically illustrating functions of the terminal 5. The terminal 5 includes a control unit 21, a storage unit 22, a RF (Radio Frequency) unit 25 and a position information acquiring unit 24 in FIG. 4. The RF unit 25 corresponds to functions of the FPGA 17 and the RF circuit 18 depicted in FIG. 3. The RF unit 25 manages the communications with the macrocell base station 2 and the microcell base stations 4.

The control unit 21 is a function acquired through the execution of the program by the CPU 14 and the DSP 16 illustrated in FIG. 3. The control unit 21 measures a quality (radio quality) of the radio signal through the wireless communications with the base stations by using the RF unit 25. The control unit 21 stores a measured result in the storage unit 22. The control unit 21 measures a throughput (a data flow rate (traffic)) related to the communications with base stations to store a measured throughput in the storage unit 22. The control unit 21 measures the radio quality and the throughput, e.g., periodically or regularly.

Any type of existing methods may be applied to a method of measuring the radio quality and the throughput. A direction of measuring the throughput may be at least any one of the downlink direction and the uplink direction. A variety of index values used for measuring the existing radio qualities may be applied to the radio quality. Information representing the radio quality may contain, e.g., a reception intensity of the radio waves from the base station, a signal-to-interference-plus-noise ratio (SINR) and so forth.

The acquiring unit 24 is a function of the GPS receiver 10 depicted in FIG. 3. The acquiring unit 24 acquires GPS information, i.e., the position information of the terminal 5, and stores the acquired information in the storage unit 22. The storage unit 22 is a function of the flash memory 13 and a function of the memory 15 illustrated in FIG. 3. The storage unit 22 stores an identifier (user's identifier) of the terminal 5, the measured results of the radio quality and the throughput, and the position information of the terminal 5. The control unit 21 transmits the identifier (user's identifier) of the terminal 5, the throughput (data flow rate) and the position information of the terminal 5 to the base station of the visited cell of the terminal 5 with a predetermined period.

<Example of Configuration of Base Station>

Figure 5:
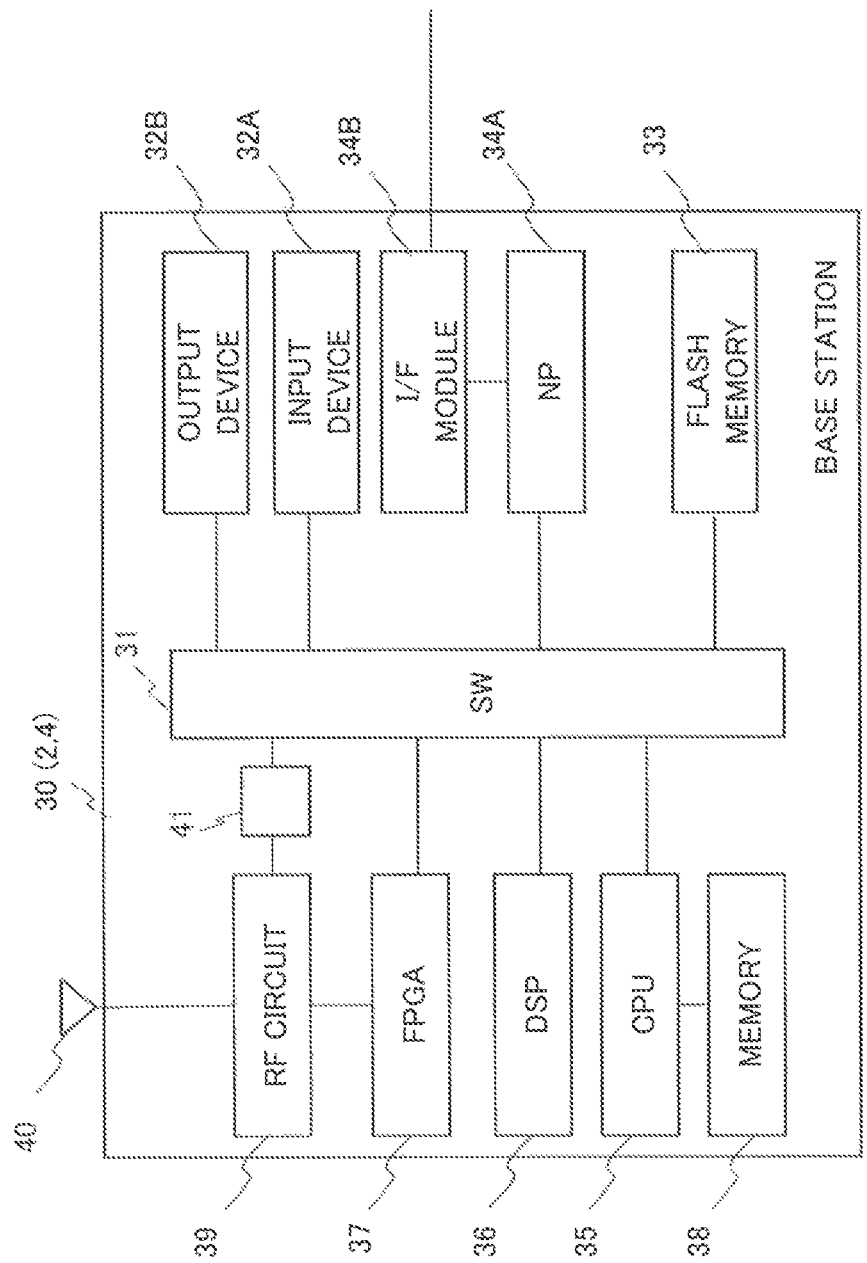
FIG. 5 is a diagram illustrating an example of a hardware configuration of a base station apparatus (base station) usable as a macrocell base station and a microcell base station.

FIG. 5 is a diagram illustrating an example of a hardware configuration of a base station apparatus 30 (simply referred to as "the base station 30" hereinafter) being usable as the macrocell base station 2 and the microcell base station 4. The base station 30 executes a process related on a user plane (U plane) and a process related to a control plane (C plane). The U plane related process includes, e.g., a process (uplink transmission) of forwarding data (user data) received from the terminal 5 (user) to a core network, and a process (downlink transmission) of forwarding the user data received from the core network to the terminal 5. The C plane related process includes transmitting and receiving the control signal to and from Mobility Management Entity (MME), transmitting and receiving the control signal to and from the terminal 5 and controlling the operation of the base station 30 by using the control signals received tom the MME and the terminal 5.

The base station 30 includes an internal switch (SW) 31, a network processor (NP) 34A connected to the internal switch 31, and a flash memory 33 in FIG. 5. The NP 34A is connected to an interface module 34B (I/F 34B). The I/F 34B receives a communication line (S1 line) connected to the unillustrated core network.

The base station 30 is connected to the MME via an S1-MME interface on the S1 line. The base station 30 is connected to a Serving Gateway (SGW) via an S1-U interface on the S1 line. The SGW is connected to a Packet Data Network Gateway (PGW). The MME is a node to handle the control plane (C plane) such as registering the position of the terminal 5 and setting a bearer. The SGW and the PGW are nodes on the user plane (U plane) to handle forwarding the user data (packet).

The base station 30 includes a CPU 35, a DSP 36 and a FPGA 37 each connected to the SW 31. The CPU 35 is connected to a memory 38. The FPGA 37 is connected to an RF circuit 39. The RF circuit 39 is connected to a transmission/reception antenna 40.

The SW 31 manages the transmission/reception process of the signals between the circuits connected to the SW 31. The NP 34A and the I/F 34B function as line interfaces with the core network and the cable network N (FIG. 2). The NP 34A executes, e.g., a process (IP protocol process) related to an Internet Protocol (IP) packet in the signals received by the I/F 34B, the IP packet being transmitted to the I/F 34B. The I/F 34B executes a process of converting the IP packet received from the NP 34A into the signal to be transmitted from the core network, a process of converting the signal received from the core network into the IP packet, and so on. Messages transmitted and received to and from the server 6 are transmitted and received by the I/F 34B and given to the CPU 35 via the SW 31.

The DSP 36 operates as a BB processing unit to execute the BB process on the user data similarly to the DSP 16. The FPGA 37 operates as the orthogonal modem unit to perform the orthogonal modulation/demodulation process similarly to the FPGA 17. The RF circuit 39 has the same configuration as the RF circuit 18 has. The RF circuit 39 performs the transmission/reception process of the radio signals (radio waves) using the transmission/reception antenna 40.

The memory 38 is one example of the main storage device (main memory). The memory 38 includes, e.g., the RAM and the ROM. The memory 38 is used as an operation area for the CPU 35. The flash memory 33 is one example of the auxiliary storage device. The flash memory 33 stores the data used for controlling the operation of the base station 30 and the programs executed by the CPU 35 and the DSP 36.

The CPU 35 executes a variety of processes related to the C plane through transferring and receiving the control signals (control information) to and from the MME and the terminal. For example, the CPU 35 carries out a call process (attaching, call originating, call receiving, detaching) of the terminal 5 and an operation administration and maintenance (OAM) process for the base station 30. The CPU 35 executes the processes pertaining to a synchronous signal, report information, transmission control and the handover.

An input device 32A includes at least one of a set of keys and a touch panel, and a microphone and is used for inputting the information. An output device 32B includes at least one of a display, a lamp, a speaker and a vibrator, and outputs the information.

Moreover, the base station 30 used as the microcell base station 4 includes a power control circuit 41 connected to the SW 31 and the RF circuit 39. The power control circuit 41 controls the transmission power when the RF circuit 39 radiates (transmits) the radio waves from the transmission/reception antenna 40 in accordance with an instruction given from the CPU 35. The control of the transmission power includes setting ON/OFF a supply of the transmission power, and increasing and decreasing the transmission power. The base station 30 is used as the macrocell base station 2, in which case the power control circuit 41 may not be included.

The base station 30 used as the macrocell base station 2 is constructed to form a predetermined number (e.g., "6") of macrocells 1. In this instance, the base station 30 has a configuration including, e.g., the FPGAs 37, the RF circuits 39 and the transmission/reception antennas 40 with their numbers corresponding to, e.g., the number of cells. However, a proper number, i.e., at least one (or more) may be set to the number of macrocells 1 being configurable by the macrocell base station 2, and numeric values exclusive of "6" may be applied.

Note that the embodiment assumes the positions of the macrocell 1 and the microcells 3 being fixed. However, a part or the whole of the microcell base stations (small cell base stations) may be enabled to migrate. In this case, the microcell base station 4 to migrate has, e.g., the GPS receiver to periodically notify the server 6 of the position information (latitude and longitude) of the microcell base station 4. The server 6 manages the positions of the respective microcells 3 based on the position information of the microcell base station 4.

Figure 6:
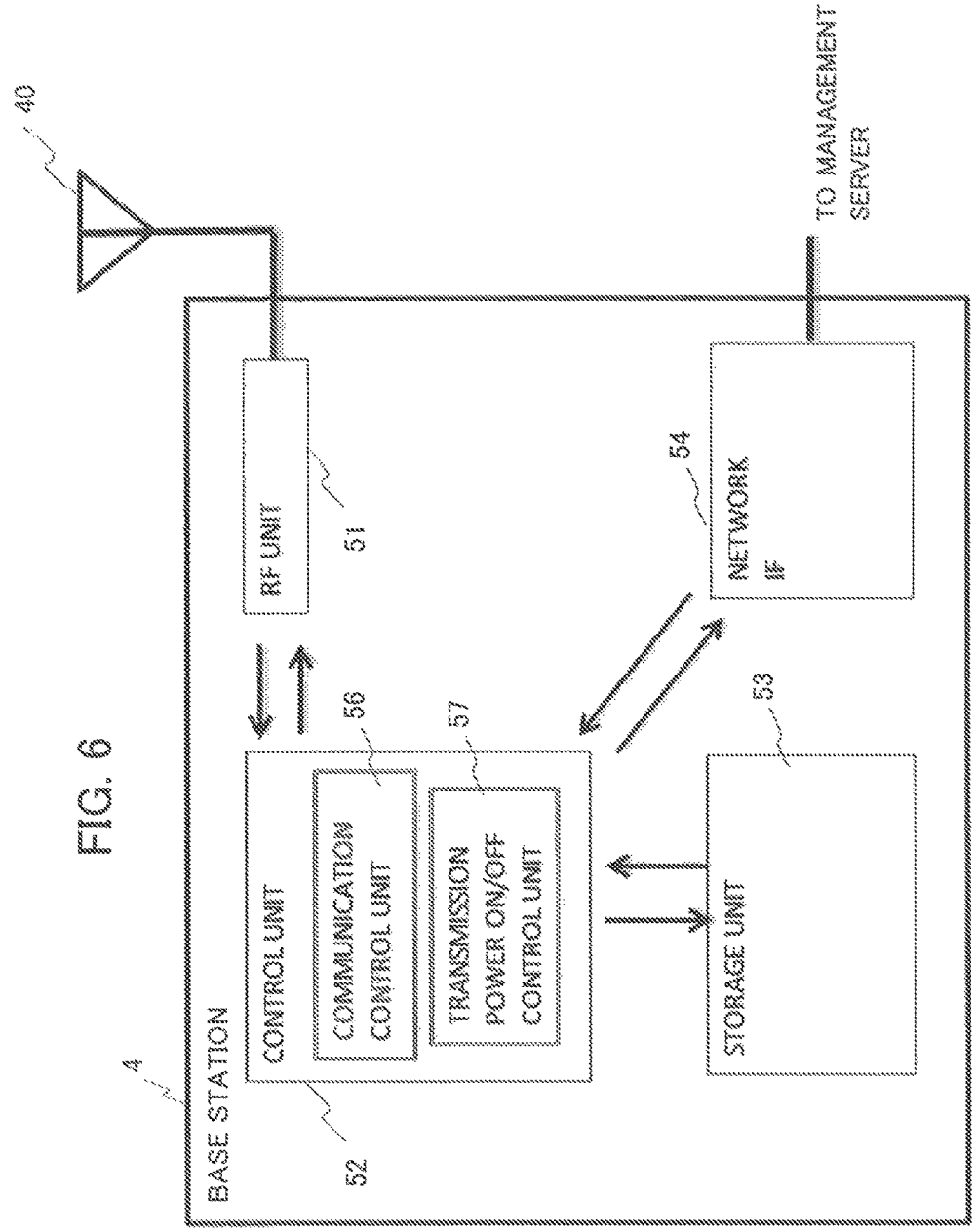
FIG. 6 is a block diagram schematically illustrating functions of the microcell base station.

FIG. 6 is a block diagram schematically illustrating functions of the microcell base station 4. As illustrated in FIG. 6, the microcell base station 4 operates as an apparatus including a RF unit 51 connected to the transmission/reception antenna 40, a control unit 52, a storage unit 53 and a network interface (network IF) 54.

The RF unit 51 is a function occurring upon operations of the FPGA 37 and the RF circuit 39 illustrated in FIG. 5. The RF unit 51 performs the wireless communications with the terminal 5. The control unit 52 is a function occurring upon operations of the CPU 35 and the DSP 36 depicted in FIG. 5. The control unit 52 includes a communication control unit 56 and a transmission power ON/OFF control unit 57. The communication control unit 56 receives the user information periodically transmitted from the terminal 5 through the wireless communications with the terminal 5. The communication control unit 56 stores the received information in the storage unit 53. The communication control unit 56 performs the communications with the server 6, and transmits traffic information and the user information each being described later on to the server 6. The control unit 57 controls ON/OFF the transmission power by use of the power control circuit 41 in accordance with a transmission power ON/OFF instruction message received from the server 6. The control unit 57 may increment and decrement a value of the transmission power by using the power control circuit 41.

The storage unit 53 is a function of the flash memory 33 and a function of the memory 38. The storage unit 53 includes a storage area to store information (user identifier, data flow rate and position information) given form each subordinate terminal 5, the information being measured by the communication control unit 56. The communication control unit 56 obtains a total value of an aggregation of the data flow rates, stored in the storage unit 53, of the individual terminals 5 and the number of terminals 5 kept in communication among the subordinate terminals 5. The communication control unit 56 generates traffic information (information on the traffic using the microcells 3) containing the total sum and the number of terminals 5, and sends the generated information to the server 6. The communication control unit 56 sends the user information to the server 6. The terminals 5 kept in communication include the terminal 5 with the data flow rate not being "0". Alternatively, the terminal 5 with the data flow rate being equal to or larger than a predetermined value maybe set as the terminal 5 kept in communication. The network IF 54 is a function of the NP 34A and a function of I/F 34B illustrated in FIG. 5. The network IF 54 manages the communications with the server 6.

Figure 7:
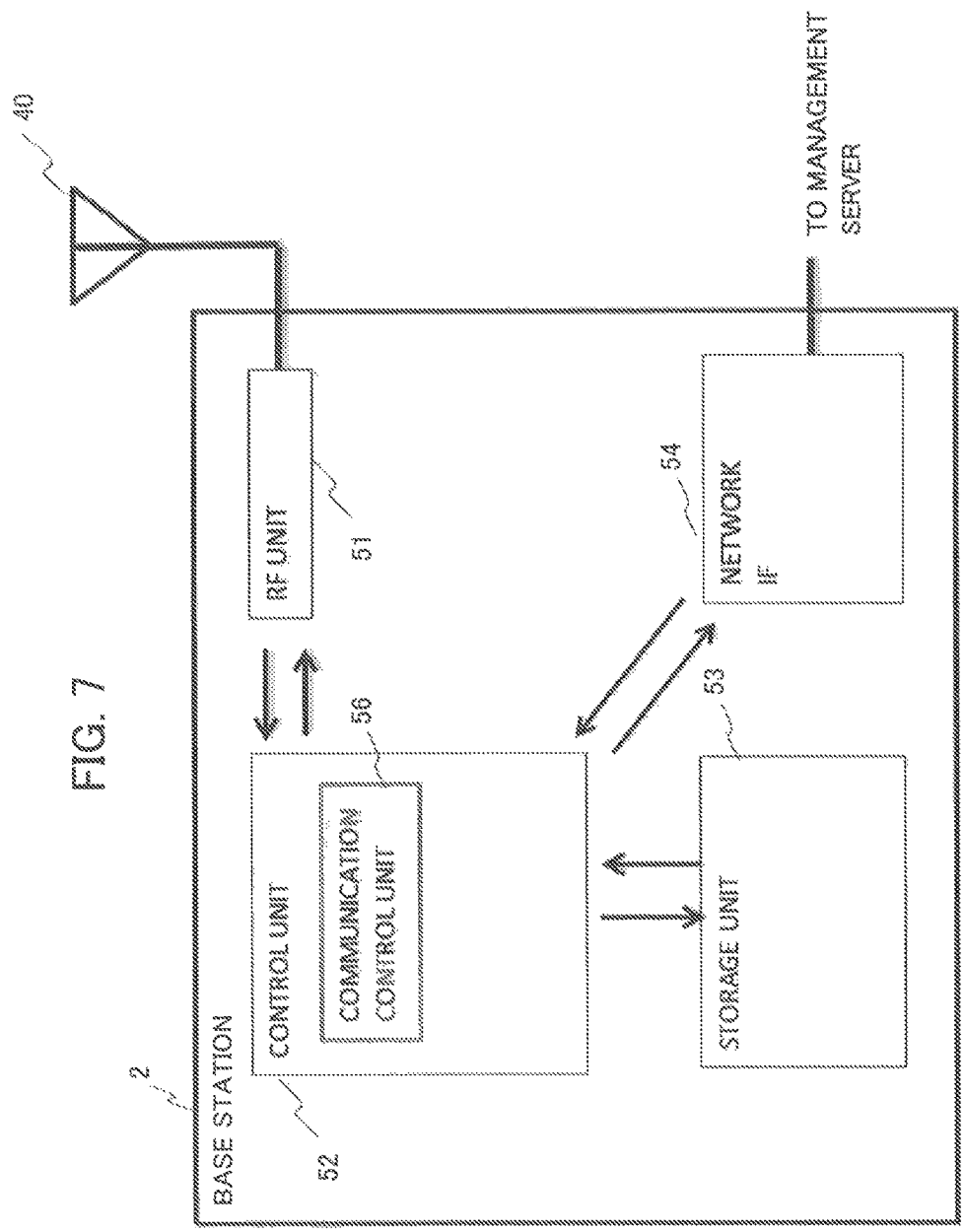
FIG. 7 is a block diagram schematically illustrating functions of the macrocell base station.

FIG. 7 is a block diagram schematically illustrating functions of the macrocell base station 2. The macrocell base station 2 operates as an apparatus including the RF unit 51 connected to the transmission/reception antenna 40, the control unit 52, the storage unit 53 and the network interface (network IF) 54. The macrocell base station 2 is equipped with the same functions as those of the microcell base station 4 in that the control unit 57 is not provided therein.

<Example of Hardware Configuration of Management Server>

Figure 8:
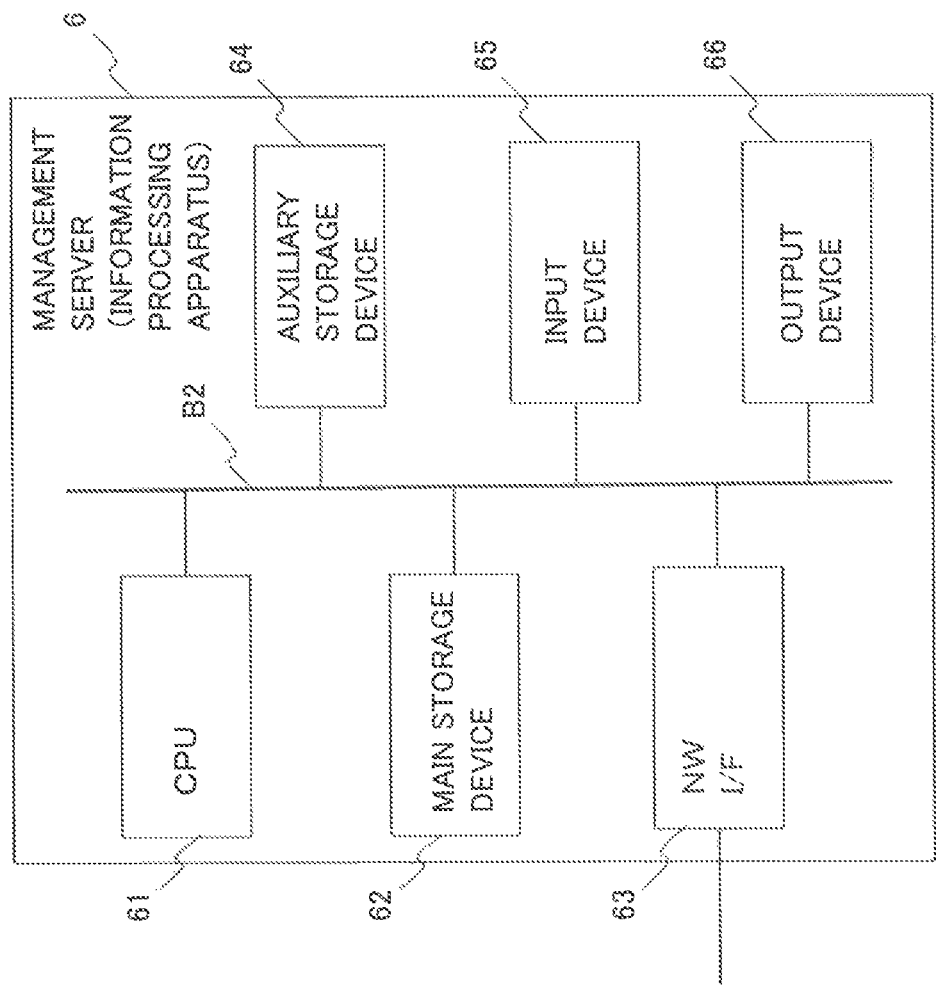
FIG. 8 is a diagram illustrating an example of a hardware configuration of an information processing apparatus (computer) operating as a management server.

FIG. 8 is a diagram illustrating an example of a hardware configuration of an information processing apparatus (computer) operating as the management server 6. The server 6 includes a CPU 61, a main storage device 62, a network interface (NW I/F) 63, an auxiliary storage device 64, an input device 65 and an output device 66, which are interconnected via a bus B2 in FIG. 8.

The input device 65 and the output device 66 may have the same configurations as those of the input device 12 and the output device 11 (FIG. 3). The NW I/F 63 is an interface circuit to manage the communications with the macrocell base station 2 and the respective microcell base stations 4. For instance, a variety of network interface cards (NICs) such as a Local Area Network (LAN) card are applicable to the NW I/F 63.

The main storage device 62 (main memory) is exemplified by the ROM and the RAM. The main storage device 62 is used as an operation area for the CPU 61. The auxiliary storage device 64 is a storage device to store the programs and the data. The auxiliary storage device 64 includes a nonvolatile storage medium. The nonvolatile storage medium includes the HDD, the SSD, the flash memory, the EEPROM, etc. The main storage device 62 and the auxiliary storage device 64 are one examples of "a memory", "a non-transitory computer readable storage medium", "a storage unit" and "a storage device".

The CPU 61 loads the programs stored in the auxiliary storage device 64 into the main storage device 62, and executes the programs. The programs being executed, the information processing apparatus operates as the server 6. The CPU 61 is one example of "a processor", "a control apparatus" and "a control unit". Note that a general-purpose or dedicated computer such as a PC (Personal Computer), a WS (Workstation) and a server machine may be applied to the information processing apparatus operating as the server 6.

A part of the whole of the functions executed by "the processor" such as the CPUs 14, 35 and 61 may also be implemented by hardware logic (wired logic) as a hardware component. The hardware configuration is attained by, e.g., an electrical and electronic circuit, an integrated circuit (at least one of, e.g., IC, LSI, Application Specific Integrated Circuit (ASIC)) and at least one of programmable logic devices (PLDs)) such as the FPGA. In this case, one hardware device may execute a plurality of functions, and one function may also be executed by a combination of the plurality of hardware devices.

FIG. 9 is a diagram schematically illustrating functions of the management server 6. The CPU 61 of the server 6 executes the programs. The programs being executed, the server 6 functions as apparatus including a control unit 71, a storage unit 72, a mesh information analyzing unit 73, a position information analyzing unit 74 (a position information analyzing unit 73, a mesh information analyzing unit 74) a transmission power ON/OFF determining unit 75 and an NW I/F.

The control unit 71 is one of the functions of the CPU 61. The control unit 71 includes the macrocell control unit 71A and a microcell control unit 71B. The macrocell control unit 71A controls ON/OFF the macrocell 1 formed by the macrocell base station 2. The microcell control unit 71B controls ON/OFF the microcell 3 formed by each microcell base station 4. As described above, the ON/OFF of the cell is made by switching ON/OFF the transmission power of the base station (the macrocell base station 2, the microcell base station 4) configuring the cell.

The position information analyzing unit 73 is one of the functions of the CPU 61. The analyzing unit 73 analyzes the position information of the respective base stations (the microcell base station 4, the macrocell base station 2) and the position information of each terminal 5. The mesh information analyzing unit 74 is one of the functions of the CPU 61. The analyzing unit 74 converts the position of the terminal 5 into mesh information, the position being obtained by the analyzing unit 73. The analyzing unit 74 deduces identification information (mesh code) of the small area to which the positions of the base station and the terminal 5 belong.

FIG. 10A is an explanatory diagram of the mesh. The "mesh" is a segmented configuration (segmented in grid) into square small areas (segmented in grid) of a certain (broad) area. For example, "area-wide mesh" (created by Ministry of Public Management, Home Affairs, Posts and Telecommunications) with a national domain being segmented into square small local zones by latitudes and longitudes, is applied to the mesh. The small area is set to, e.g., a square with sides of 100 meters (where a length of one side is instanced). Numbers (one example of the identification information) called "grid square codes" are allocated to the respective small areas. FIG. 10A illustrates an example of the grid square codes being allocated to the small areas in a certain area zoned into 13×13 small areas. Note that a shape of the small area may take, without being limited to the square (quadrate), a quadrangle other than the square, a triangle, a hexagon, an octangle and a polygon exclusive of these shapes as the case may be.

Figure 10B:
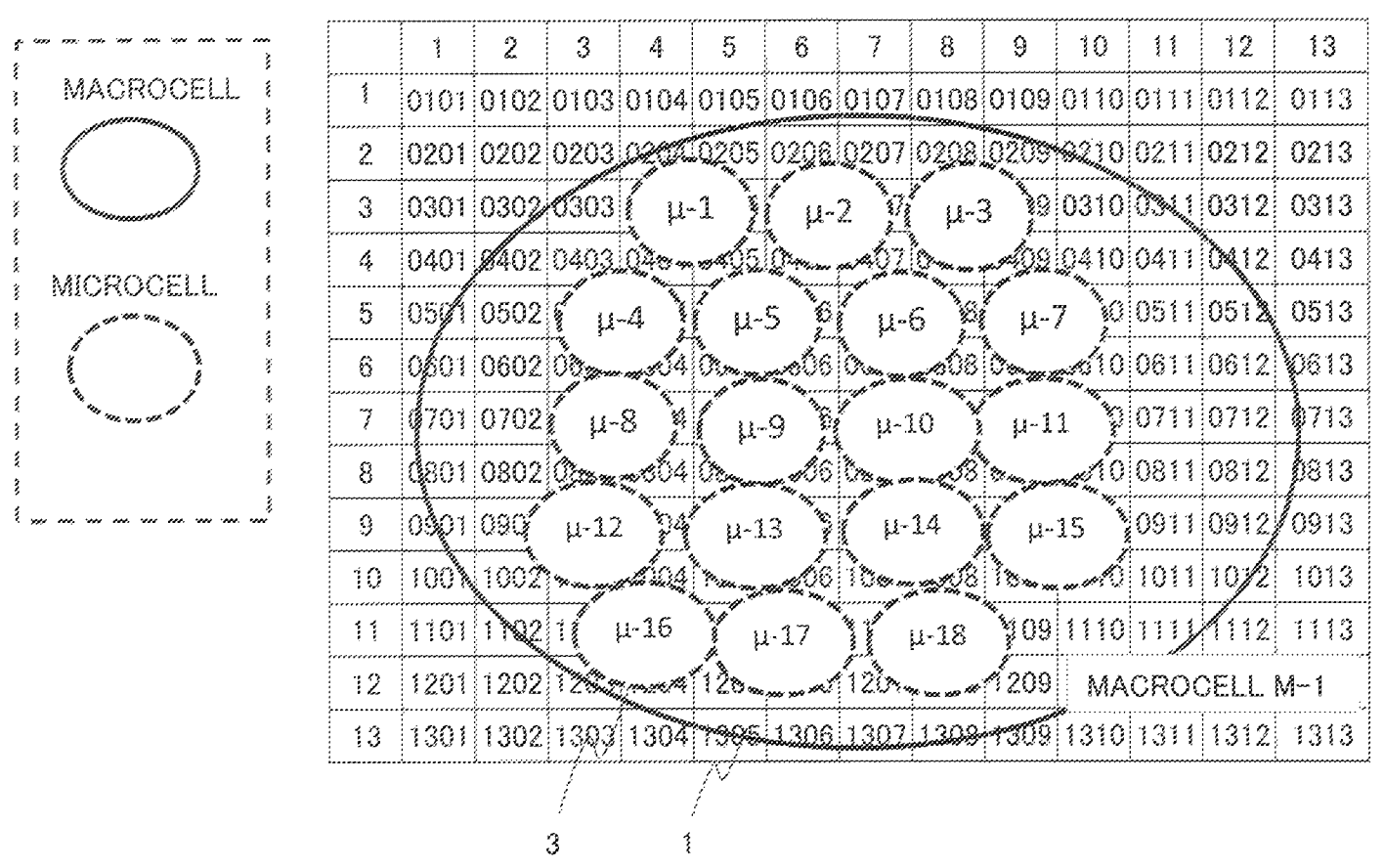

FIG. 10B is an explanatory diagram schematically illustrating a associative relationship between, the mesh, the macrocell 1 and the microcell 3. FIG. 10B schematically depicts a state of superposing coverage areas of the macrocell 1 (a macrocell M-1 is illustrated in FIG. 10B) and the microcells 3 (microcells μ-1 through μ-18 are illustrated in FIG. 10B) on the mesh illustrated in FIG. 10A. Thus, the grid square codes of the small areas overlapped with the coverage areas of the respective cells are managed as the grid square codes associated with the respective cells 1, 3.

Referring back to FIG. 9, the determining unit 75 is one of the functions of the CPU 61. The determining unit 75 controls ON/OFF the transmission power of each of the macrocell base station 2 and the microcell base stations 4. The NW I/F 63 includes a NW I/F 63A for the macrocell 1 and a NW I/F 63B for the microcells 3. The NW I/F 63A manages the communications with the macrocell base station 2. The NW I/F 63B manages the communications with the respective microcell base stations 4. The storage unit 72 stores information (data) to be received and transmitted respectively from and to the macrocell base station 2 and the microcell base stations 4.

<Data and Table>

Next, data and tables used in the HetNet system will be explained.

<<Traffic Information Management Table per Base Station>>

FIG. 11 is a diagram illustrating an example of a data structure of a traffic information management table 80 (simply termed "the table 80" hereinafter) per base station. The table 80 is used for the server 6 to manage the traffic information (data flow rate (throughput) on the U plane per cell) of the base station (the macrocell base station 2, the microcell base station 4).

The table 80 retains (stores) records each containing fields such as a cell name (cell identification (ID) information), a data flow rate and a number of users in communication per cell in FIG. 11. The cell name is an identifier of the macrocell 1 and an identifier of the microcell 3. The cell name is one example of a cell identifier from which the cell may be uniquely identified. The data flow rate represents a data size per unit time, the data being communicated via the cell. The data flow rate corresponds to the throughput. The number of users in communication represents the number of users (terminals 5) kept in communication via the cell (in service).

The items of information contained each of the records organizing the table 80 are periodically acquired from each of the macrocell base station 2 and the microcell base stations 4. The acquired information is stored in the storage unit 72 (at least one of the main storage device 62 and the auxiliary storage device 64). The record of the table 80 is acquired, upon occurrence of an alarm of the terminal 5, from the base station receiving this alarm.

FIG. 12 is a diagram illustrating one example of a format of traffic information (a record of the traffic information) transmitted from each of the base stations 2 and 4. As illustrated in FIG. 12, the traffic information contains: a cell name "C" of the microcell 3 formed by the microcell base station 4 of a traffic information sender; a data flow rate "D" in the microcell 3; and a user count "U" in communication. The data flow rate "D" is a total value of the data flow rates of the respective subordinate terminals 5, the flow rates being collected by the microcell base station 4. The user count "U" in communication is a value obtained by totalizing the number of terminals 5 in communication via the microcell base station 4.

The control unit 71 of the server 6, upon receiving the traffic information record from the NW I/F 63B, stores (newly registers or updates) the received traffic information in the table 80.

Note that one table 80 receives registration of a record of one macrocell 1 and the respective microcells 3 deployed within the macrocell 1. The server 6, when managing the plurality of macrocell base stations 2 (macrocells 1), becomes a status of having the table 80 per macrocell 1.

<<Mesh Code-Macrocell/Microcell Associative Table>>

FIG. 13 is a diagram illustrating an example of a data structure of a mesh code-macrocell/microcell associative table 81 (simply termed "the table 81" hereinafter). The table 81 is used for calculating the macrocell 1 and the microcell 3 associated with the mesh code (grid square code). The mesh code is an identifier of each of the segmented small areas in mesh as described above.

The table 81 is organized by an aggregation of records each containing fields such as a mesh code, an identifier (e.g.: cell name) of the macrocell associated with (corresponding to) the mesh code, and identifiers (e.g.: cell name) of the microcells associated with (corresponding to) the mesh codes in FIG. 13. The record is registered per mesh code. With a plurality of microcells 3 associated with one mesh code, one record retains the identifiers of the respective microcells 3.

The table 81 is generated beforehand and stored in the storage unit 72. The table 81 is used, e.g., as station data managed by the server 6. The table 81 contains the records of the respective mesh codes, each record having registration of the identifier of the cell from which the radio waves reach the small area having each mesh code. The input device 65 and the output device 66 may be used on the occasion of generating the table 81. The table 81 generated outside the server 6 may also be stored in the storage unit 72. Note that pieces of information of the macrocell 1 and the microcells 4 associated with the mesh codes managed by the server 6 are registered in the table 81 in the example illustrated in FIG. 13. However, the table 81 may be generated per macrocell 1 as the case may be.

<<Macrocell/Microcell-Mesh Code Associative Table>>

FIG. 14 is a diagram illustrating an example of a data structure of a macrocell/microcell-mesh code associative table 82 (simply termed "the table 82" hereinafter). The table 82 is used for calculating the associative mesh codes from the identification information (cell names) of the base stations. The table 82 is previously generated and stored in the storage unit 72. The table 82 is used, e.g., as the station data managed by the server 6.

The table 82 is an aggregation of the records containing registration of one or more mesh codes associated with the cell names (the identification information of the base stations) of the cells in FIG. 14. The table 82 contains the respective records indicating the mesh codes of the meshes at which the radio waves arrive from the base stations configuring the cells having the cell names. The table 81 and the table 82 being thus provided, the server 6 is enabled to deduce both of the cell from the mesh code and the mesh from the cell name. It is not, however, a prerequisite to provide both of the table 81 and the table 82. It may also be available to provide only one of these tables.

<<Mesh Code-User Management Table>>

FIG. 15 is a diagram illustrating an example of a data structure of a mesh code-user management table 83 (simply termed "the table 83" hereinafter). The table 83 is used for calculating the number of users (terminals 5) existing in the meshes having the mesh codes. The table 83 is stored in the storage unit 72. Contents registered in the table 83 are updated by the mesh information analyzing unit 74 and the control unit 71 based on the user information received respectively from the macrocell base station 2 and the microcell base stations 4.

The table 83 contains, as illustrated in FIG. 15, registration of a user count (the number of terminals 5) associated with the each mesh code, and an identifier (user identifier) of each terminal 5 located in (belonging to) the small area specified by the mesh code. The storage unit 72 retains the mesh codes and latitude/longitude information of the small area specified by the mesh code as mesh information managed by the server 6. The analyzing unit 74, upon receiving the position information (the latitude and the longitude) of the terminal 5, calculates the mesh code of the small area in which the terminal 5 is located by use of the mesh information. The control unit 71 totalizes the number of terminals 5 per mesh code, and stores a totalized result (total value) in the table 83.

<<User Information Management Table>>

FIG. 16 is a diagram illustrating an example of a data structure of user information management table 84 (simply termed "the table 84" hereinafter). The table 84 is a table for managing the position information of the individual users (terminals 5) and the data flow rates (throughputs) measured on the respective terminals 5. The table 84 is stored in the storage unit 72.

As depicted in FIG. 16, the table 84 is an aggregation of records each containing fields such as a user identifier, a data flow rate (throughput) associated with the user identifier and position information of the user (terminal 5). The user identifier contains, e.g., a telephone number and International Mobile Subscriber Identity (IMSI). FIG. 16 illustrates an example of the IMSI being applied as the user identifier. However, such information other than the telephone number and the IMSI are applicable as to enable the user (terminal 5) to be uniquely identified. The position information is, e.g., latitude/longitude information. However, information other than the latitude/longitude Information may also be applied as far as enabling the position of the terminal 5 to be specified.

The server 6 receives the user information records respectively from the macrocell base station 2 and the microcell base stations 4. The control unit 71 stores the received user information records in the table 84. FIG. 17 is a diagram illustrating an example of a format of the user information record received by the server 6. The user information record contains fields such as a user identifier "UI", a data flow rate "DU", position information (latitude) "LA" and position information (longitude) "LO". The user information records are transmitted respectively from the macrocell base station 2 and the microcell base stations 4 connected to the users (terminals 5). The user information records are received by the NW I/F 63. The control unit 71 registers the received user information in the table as the table entries.

<<Threshold Value Management Table>>

FIG. 18 is a diagram illustrating an example of a data structure of a threshold value management table 85 (simply termed "the table 85" hereinafter). The table 85 is a table for managing threshold values used for the determining unit 75 to make an ON/OFF determination of the transmission power. The table 85 is previously stored in the storage unit 72 of the server 6. The table 85 is usable as, e.g., the station data.

As depicted in FIG. 18, the table 85 retains the following threshold values as constant data. In other words, the table 85 retains an upper limit threshold value and a lower limit threshold value against the data flow rate in the macrocell 1. The table 85 retains an upper limit threshold value and a lower limit threshold value against the number of the users (terminals 5) connected to the macrocell 1 (macrocell base station 2). The table 85 further retains an upper limit threshold value and a lower limit threshold value (upper and lower limit threshold values of microcell data flow rate) against the data flow rate in the microcell 3 (microcell base station 4). The table 85 still further retains an upper limit threshold value and a lower limit threshold value against the number of microcells 3 (microcell base station 4).

The storage unit 22 (at least one of the flash memory 33 and the memory 15) of each terminal 5 stores at least a record of the upper limit threshold value of the microcell data flow rate and a record of the lower limit threshold value of the microcell data flow rate in the records in the table 85. The records (threshold values) are used for determining whether each terminal 5 generates an alarm.

<<Schedule Management Table>>

FIG. 19 is a diagram illustrating an example of a data structure of a schedule management table 86 (simply termed "the table 86" hereinafter). The table 86 is a table for managing a date predicted to increase a connected user count and the macrocell 1. The table 86 is previously stored in the storage unit 72. The table 86 is usable as, e.g., the station data. The table 86 is used for setting ON the microcell 3 as adjusted to a period of time when a traffic demand increases as in the case of an event.

As illustrated in FIG. 19, the table 86 contains registration of identification information (determination parameter) of an event (such as a concert, a competition and an event for traffic regulations) estimated to increase a number of user connections to the base stations, and a date of the event. The table 86 also contains registration of the identification information of the macrocell 1 predicted to increase the number of user connections as being associated with the event and the event date. The determination parameter may also encompass registration of dates of actual results in the past with event names and circumstances being unknown but the user count in the macrocell 1 being increased. Note that not the date but only the day may be registered as a period of time for the registration as the case may be. In short, the period of time maybe properly set.

<<Microcell ON/OFF Management Table>>

FIG. 20 is a diagram illustrating an example of a data structure of a microcell ON/OFF management table 87 (simply termed "the table 87" hereinafter). The table 87 is a table for managing an ON/OFF status of each microcell 3. The table 87 is stored in the storage unit 72.

As illustrated in FIG. 20, the table 87 retains a total number of the terminals 5 (users), a status (ON/OFF) of the microcell 3 and a total value of the data flow rates measured in the respective terminals 5 per cell name of the microcell 3. The table 87 further retains a mesh code of each small area overlapped with a coverage area of each microcell 3, and the number of terminals 5 located in each small area.

<Trigger for ON/OFF Determination of Microcell (Transmission Power)>

The following is a trigger for the ON/OFF determination of the microcell 3 (transmission power) in the embodiment, the determination being made by the determining unit 75 (CPU 61) of the server 6.

(1) Periodic Monitoring

The control unit 71 (CPU 61) of the server 6 transmits a message (referred to as an information acquiring request) for periodically requesting the macrocell base station 2 and Each of the macrocell base station 2 and the microcell base stations 4 transmits, to the server 6, a message (referred to as a response) containing the traffic information (FIG. 12) and the user information (FIG. 17) collected from the subordinate terminals 5 by the macrocell base station 2 and the microcell base stations 4 in response to the request. The determining unit 75 of the server 6 controls ON/OFF each of the microcells 3 based on the received traffic information and user information.

(2) Trigger for Alarm

When the data flow rate (throughput) increasing over the upper limit threshold value (see FIG. 18) or decreasing under the lower limit threshold value (see FIG. 18), each terminal 5 outputs an alarm. The alarm is received by the base station configuring the visited cell (macrocell 1 or the microcell 3) of the terminal 5 and transferred to the server 6. As triggered by receiving the alarm, the server 6 acquires the traffic information and the user information targeting on the visited cell of the terminal 5 and controls ON/OFF the microcell 3.

(3) Scheduling (Event, Statistical Actual Result, etc.)

The server 6, when reaching start time of the period of time of the event etc. registered in the schedule management table 86 (FIG. 19), controls ON/OFF of the microcell 3 deployed within the macrocell 1 affected by the event etc.

<Operational Example>

Operational examples of the HetNet system according to the embodiment will hereinafter be described.

<<Operational Example 1>>

Figure 21:
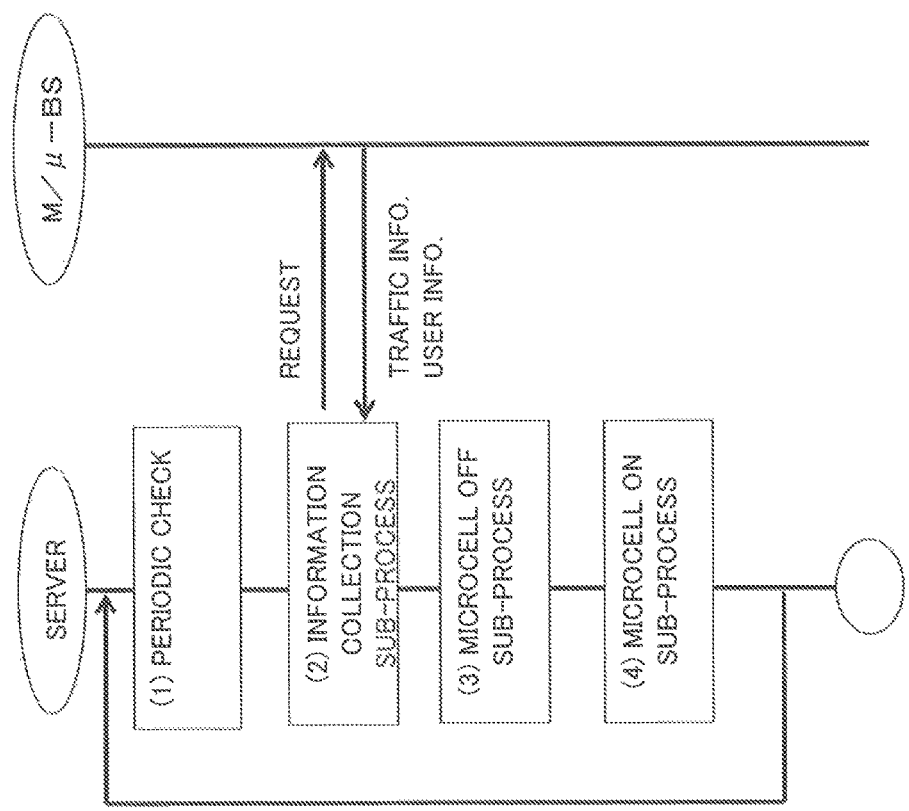
FIG. 21 is a diagram illustrating one example of a periodic process of the server.

An operational example 1 will be described of an operational example related to the server 6 controlling ON/OFF the microcell 3 through periodic monitoring of the macrocell base station 2 and the microcell base station 4. FIG. 21 is a diagram illustrating one example of a periodic process of the server 6.

The control unit 71 (CPU 61) of the server 6 executes a periodic check process at a first process (1) in FIG. 21. In other words, the server 6 sets a periodic timer for measuring periodic monitor timing. As triggered by the periodic timer becoming timeout (monitoring start timing), the control unit 71 (CPU 61) executes an information collection sub-process ((2) in FIG. 21). The control unit 71 in the information collection sub-process transmits an information acquiring request message to each of the macrocell base station 2 and the microcell base stations 4 via the NW I/F 63.

Each of the macrocell base station 2 and the microcell base stations 4 transmits, to the server 6, the traffic information (FIG. 12) and the user information (FIG. 17) as a response message to the information acquiring request. The control unit 71 receives the traffic information and the user information via the NW I/F 63.

Subsequently, the determining unit 75 executes a microcell OFF sub-process (μcell OFF sub-process) using the traffic information and the user information collected respectively from the macrocell base station 2 and the microcell base stations 4 ((3) in FIG. 21). The microcell OFF sub-process is a process of determining whether the microcell 3 (transmission power) is set OFF by using the traffic information and the user information and performing the OFF operation. In other words, the microcell OFF sub-process is a process of detecting the microcell 3 allowed to switch OFF the transmission power for configuring the microcell 3 (to stop configuring the microcell 3) and setting OFF this microcell 3.

The determining unit 75 in the next process (4) executes a microcell ON sub-process (μcell ON sub-process) using the traffic information and the user information ((4) in FIG. 21). The microcell ON sub-process is a process of causing the control unit 71 to determine whether the microcell 3 (transmission power) is set ON and to perform an ON operation. In other words, the microcell ON sub-process is a process for setting ON the microcell 3 (for starting configuring the microcell 3). Upon an end of the microcell ON sub-process, the processing loops back to the process (1). The control unit 71 resets the periodic timer and measures the next monitor timing. Note that a proper time length may be applied as a time length of the monitoring period. The following discussion will be made by taking a case of the period being 10 min for one example.

[Information Collection Sub-Process]

Figure 22:
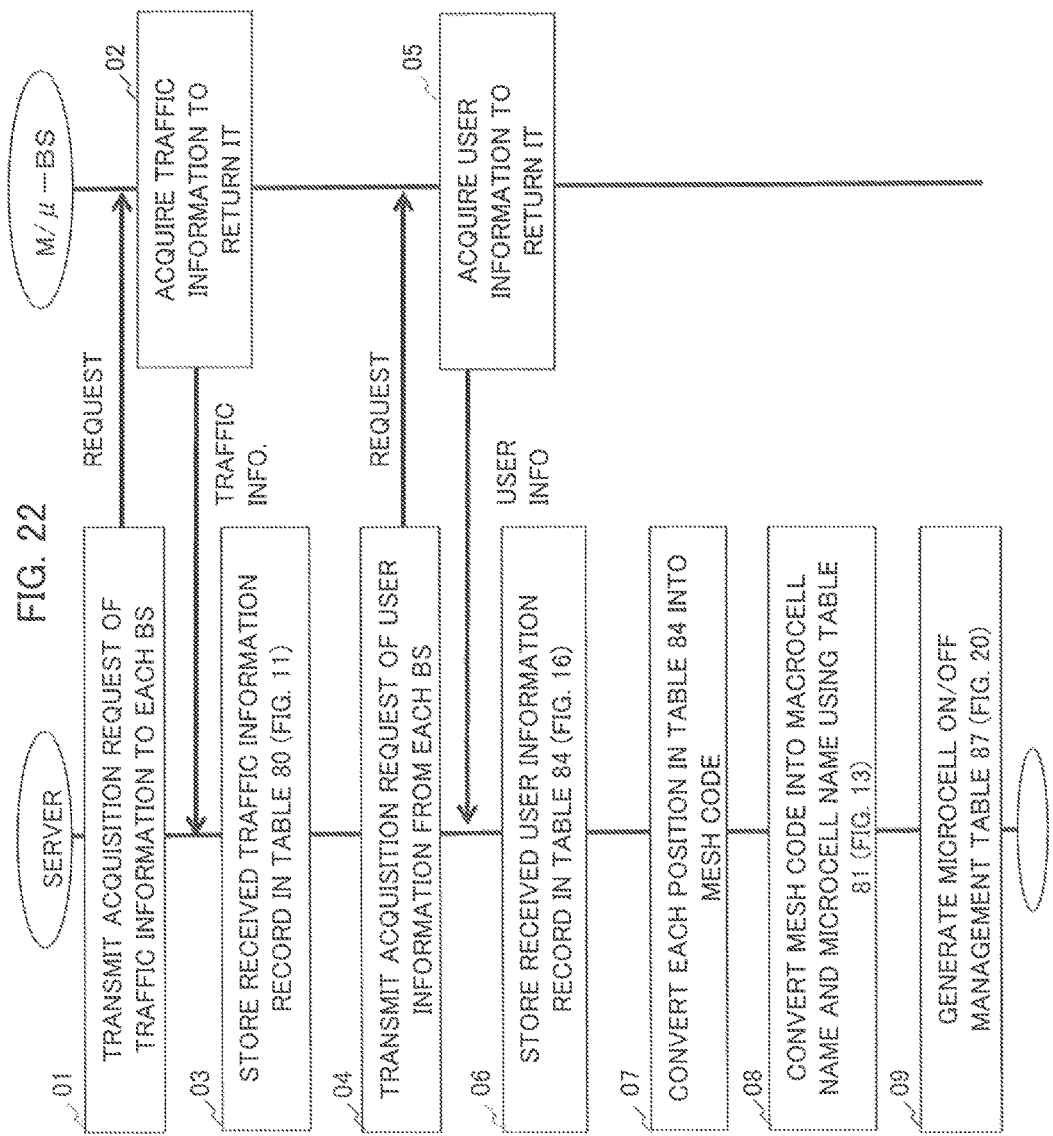
FIG. 22 is an explanatory diagram illustrating one example of an information collection sub-process ((1) in FIG. 21)

FIG. 22 is an explanatory diagram illustrating one example of an information collection sub-process ((1) in FIG. 21). The control unit 71 (CPU 61) of the server 6 in 01 queries the respective base stations (the macrocell base station 2 and the microcell base stations 4) about the traffic information. To be specific, the control unit 71 transmits a traffic information request message (request) to the respective base stations (the macrocell base station 2 and the microcell base stations 4) via the NW I/F 63.

The control unit 52 (CPU 35) of each of the base stations (the macrocell base station 2 and the microcell base stations 4) receiving the request conducts the following operation (02). Specifically, the communication control unit 56 (CPU 35) totalizes the items of traffic information (the data flow rates and the number of users (terminals 5) in communication. The communication control unit 56 stores the data flow rates and the number of terminals 5 in the storage unit 53 (at least one of the memory 38 and the flash memory 33). The communication control unit 56 generates a traffic information record (FIG. 12) containing fields such as the data flow rate and the number of terminals 5 stored in the storage unit 53, and identification information (cell name) of the self-station. The communication control unit 56 transmits the generated record as a response to the server 6.

The foregoing process of the communication control unit 56 may be carried out as follows by way of one example. To be specific, the communication control unit 56 totalizes the data flow rates and the number of terminals 5 in communication with a predetermined period (e.g., one min). The communication control unit 56 obtains, for example, an average value of the data flow rates and an average value of the number of terminals 5 per period at a length of information acquiring period (e.g., 10 min) of the server 6. The communication control unit 56 sets the average values of the data flow rates and the number of terminals 5 to be contained in the traffic information for the transmission to the server 6. Such a contrivance being thus made, it is feasible to restrain a deviation of the traffic information that is transmitted to the server 6 (it is possible to avoid transmitting a peculiar value to the server).

In a process of 03, the control unit 71 of the server 6 receives the response message (traffic information) from each of the macrocell base station 2 and the microcell base stations 4. The control unit 71 stores the traffic information given from each of the base stations (the macrocell base station 2 and the microcell base stations 4) in the traffic information management table 80 per base station (FIG. 11).

In a process of 04, the control unit 71 executes a process for acquiring the user information from each of the macrocell base station 2 and the microcell base stations 4. Specifically, the control unit 71 transmits an information acquiring message for acquiring the user information to each of the macrocell base station 2 and the microcell base stations 4.

In a process of 05, the communication control unit 56 of the control unit 52 in each of the macrocell base station 2 and the microcell base stations 4, transmits the user information (user identifier, data flow rate, position information), stored in the storage unit 53, of each terminal 5 to the server 6.

A user information collection process maybe executed as below by way of one example. To be specific, the communication control unit 56 collects the user information from the respective terminals 5 with the predetermined period (e.g., one minute). the communication control unit 56 obtains, e.g., the average value of the data flow rates and an average value of the positions of terminals 5 per period at the length of information acquiring period (e.g., 10 minutes) of the server 6. The communication control unit 56 sets the average values of the data flow rates and the positions of terminals 5 to be contained in the traffic information for the transmission to the server 6. Such a contrivance being thus made, it is feasible to restrain a deviation of the traffic information that is transmitted to the server 6 (it is possible to avoid transmitting a peculiar value to the server).

In a process of 06, the control unit 71 of the server 6 stores the user information per terminal 5 in the user information management table 84 (FIG. 16). In the process of 07, the analyzing unit 74 converts the position information, stored in the table 84, of each terminal 5 into the mesh code. Specifically, the analyzing unit 74 compares the mesh information (containing information with position information of each small area being defined) stored beforehand in the storage unit 72 with the position information of each terminal 5, thus obtaining the mesh code of the small area to which the position of the terminal 5 belongs. Then, the control unit 71 stores the number of terminals 5 associated with the respective mesh codes. The control unit 71 stores the identifier (user identifier) of the terminal 5 to be associated with the mesh code.

In a process of 08, the control unit 71 of the server 6 converts the obtained mesh codes associated with the terminals 5 into a macrocell name and microcell names (only the microcell names may also be available as the case may be) by using the mesh code-macrocell/microcell associative table 81 (FIG. 13).

In 09, the control unit 71 of the server 6 generates the microcell ON/OFF management table 87 (FIG. 20) in, e.g., the following procedure. The control unit 71 obtains the mesh code associated with the microcell name from the macrocell/microcell-mesh code associative table 82 (FIG. 14). Subsequently, the control unit 71 obtains the user count (the number of terminals 5) associated with the mesh code and the identifier (user identifier) of each terminal 5 from the mesh code-user management table 83 (FIG. 15). Subsequently, the control unit 71 acquires the data flow rate of each terminal 5 from the user information management table 84 (FIG. 16) by using the user identifier of each terminal 5, thus obtaining a total value of t the data flow rates.

The control unit 71 generates one entry for the table 87, i.e., the microcell name, the user count associated with the microcell name, the total value of data flow rates, the each mesh code associated with the microcell name, and the user count associated with each mesh code. The control unit 71 stores these items of information in the table 87. Such a process is executed with respect to each microcell name obtained in the process of 08. The table 87 is thus generated. Thereafter, the processing advances to the microcell OFF sub-process.

[Microcell OFF Sub-Process]

Figure 23:
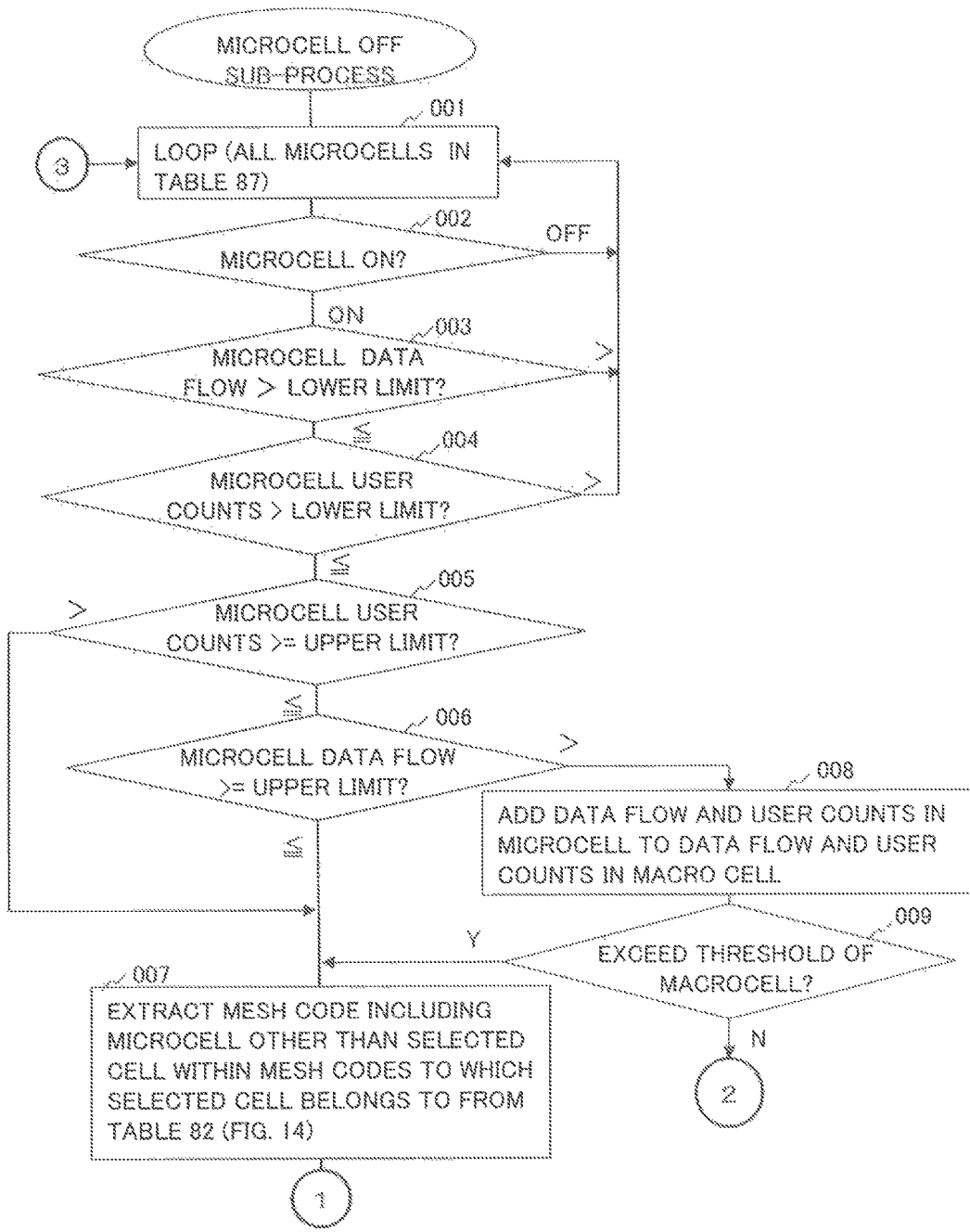
FIG. 23 is a flowchart illustrating one example of a microcell OFF sub-process ((3) in FIG. 21)
Figure 24:
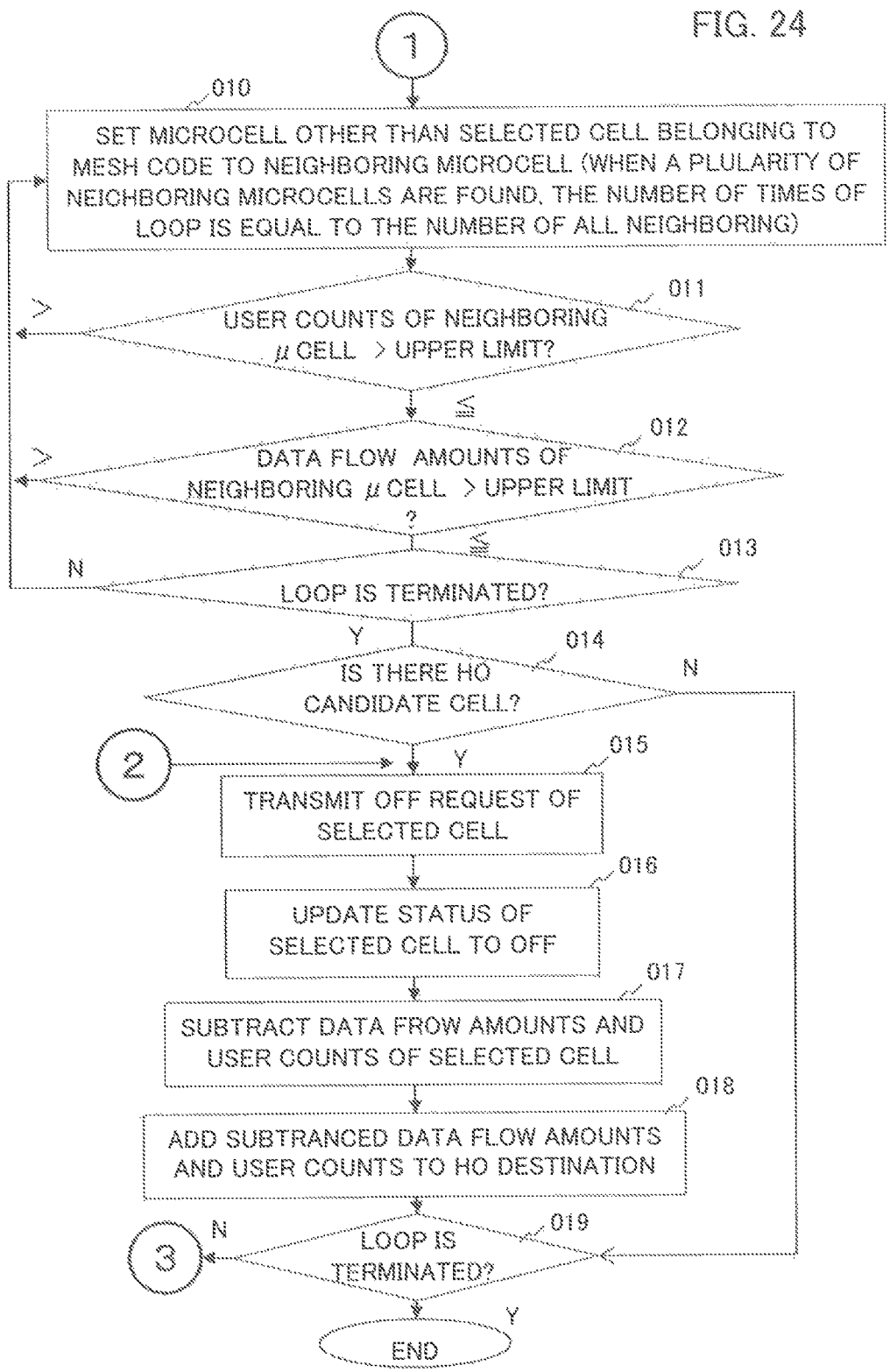
FIG. 24 is a flowchart illustrating one example of the microcell OFF sub-process ((3) in FIG. 21)

FIGS. 23 and 24 are flowcharts each illustrating one example of the microcell OFF sub-process ((3) in FIG. 21). FIG. 25 illustrates one example of the microcell ON/OFF management table 87. FIG. 26 depicts one example of a part of the traffic information management table 80 per base station (a record of the macrocell 1).

Processes illustrated in FIGS. 23 and 24 are executed by, e.g., the control unit 71, the analyzing unit 73 and the determining unit 75 of the server 6 in cooperation. However, with the control unit 71, the analyzing unit 73 and the determining unit 75 being all the functions of the CPU 61, the processes given below are described as those to be executed by the CPU 61.

Upon a start of the processes in FIG. 23, the CPU 61 executes the processes from the process of 002 onward targeting on all of the microcell names (microcells (μ cells) 3) registered in the table 87 (FIG. 25). Note that the microcell 3 is set in the ON status based on the forgoing scheduling just when starting the microcell OFF sub-process, in which case this microcell is not set OFF in the OFF sub-process even when the microcell satisfies an OFF condition.

In a process of 001, the CPU 61 selects one microcell (one record) from the table 87. The selected microcell 3 is referred to as "the selected cell". In a process of 002, the CPU 61 determines whether the selected cell is in the ON status or not. When the selected cell is OFF, the processing loops back to the process of 001 to select the next microcell 3. Whereas when the selected cell is ON, the processing advances to 003.

In the process of 003, the CPU 61 compares the data flow rate in the record of the selected cell with "a microcell data flow rate lower limit threshold value" in the threshold value management table 85 (FIG. 18). Herein, when the data flow rate exceeds the lower limit threshold value (">" in 003), the CPU 61 loops back the processing to the process in 001. This is because the selected cell is used to such a degree as not to require the OFF status. Whereas when the data flow rate is equal to or smaller than the lower limit threshold value ("≤" in 003), the CPU 61 advances the processing to 004.

In the process of 004, the CPU 61 compares the user count (total value) in the record of the selected cell with "a microcell connected user count lower limit threshold value" in the table 85. Herein, when the user count exceeds the lower limit threshold value (">" in 004), the CPU 61 loops back the process of 001. This is because the selected cell is used to such a degree as not to require the OFF status. Whereas when the data flow rate is equal to or smaller than the lower limit threshold value ("≤" in 004), the CPU 61 advances the processing to 005.

In the process of 005, the CPU 61 fetches the record (FIG. 26) of the macrocell 1 (M cell) from the traffic information management table 80 per base station (FIG. 11). The CPU 61 compares the user count in the fetched record with "a macrocell connected user count upper limit threshold value" in the table 85. Herein, when the user count exceeds the upper limit threshold value (">" in 005), the CPU 61 determines that the terminal 5 subordinate to the selected cell is disabled from handing over (HO) to the macrocell 1, and advances the processing to 007. It is because the macrocell 1 has no allowance to receive the terminal 5 subordinate to the selected cell. Whereas when the user count is equal to or smaller than the upper limit threshold value ("≤" in 005), the CPU 61 advances the processing to 006.

In the process of 006, the CPU 61 compares the data flow rate in the record (FIG. 26) of the macrocell 1 (M cell) with "a macrocell data flow rate upper limit threshold value" in the table 85. Herein, when the data flow rate exceeds the upper limit threshold value (">" in 006), the CPU 61 determines that the terminal 5 subordinate to the selected cell is disabled from the handover (HO) to the macrocell 1, and advances the processing to 007. It is because the macrocell 1 has no allowance to receive the subordinate terminal 5. Whereas when the data flow rate is equal to or smaller than the upper limit threshold value ("≤" in 006), the CPU 61 diverts the processing to 008.

In the process of 008, the CPU 61 obtains a value given by adding the data flow rate and the user count of the selected cell in the table 80 to the data flow rate and the user count of the macrocell 1 in the table 80. However, a total number of user terminals and a total value of data flow rates of the selected cell, which are stored in the table 87, may also be used in place of the data flow rate and the user count of the selected cell 3 in the table 80.

In the process of 009, the CPU 61 determines whether or not at least one of an added value of the data flow rates and an added value of the user counts exceeds "the macrocell data flow rate upper limit threshold value" or "the macrocell connected user count upper limit threshold value". When both of the added value of the data flow rates and the added value of the user counts do not exceed the associative upper limit threshold values ("N" in 009), the CPU 61 advances the processing to 015 (FIG. 24). Whereas when at least one of the added value of the data flow rates and the added value of the user counts exceeds the associative upper limit threshold value ("Y" in 009), the CPU 61 determines that each subordinate terminal 5 to the selected cell is disabled from the handing over (HO) to the macrocell 1, and advances the processing to 007.

In the process of 007, the CPU 61 extracts, from the table 82 (FIG. 14), the mesh code containing the microcell 3 (another microcell 3) other than the selected cell among the mesh codes to which the selected cell belongs.

In a process of 010, the CPU 61 obtains the microcell 3 other than the selected cell belonging to the mesh code from the table 81 (FIG. 13). The CPU 61 sets the obtained microcell 3 in a neighboring microcell (neighboring μcell). In this case, a plurality of neighboring microcells is detected, in which case processes in following process of 011 and 012 are executed targeting on all of the neighboring microcells.

In the process of 011, the CPU 61 determines whether or not the user count (stored in the table 80) of the neighboring microcell exceeds the upper limit threshold value stored in the table 85 (FIG. 18). When the user count exceeds the upper limit threshold value (">" in 011), the processing loops back to the process of 010 to execute the process with respect to the next neighboring microcell. Whereas when the user count is smaller than the upper limit threshold value ("≤" in 011), the processing advances to 012.

In the process of 012, the CPU 61 determines whether or not the data flow rate (stored in the table 80) of the neighboring microcell exceeds the upper limit threshold value stored in the table 85 (FIG. 18). Herein, when the data flow rate exceeds the upper limit threshold value (">" in 012), the processing loops back to step 010 to execute the process with respect to the next neighboring microcell. When the data flow rate is smaller than the upper limit threshold value ("≤" in 012), the processing advances to S013.

In the process of 013, the CPU 61 determines whether or not a processing loop is ended, i.e., the processing for all of the neighboring microcells is finished. When the processing loop is terminated ("Y" in 013), the processing advances to 014. Whereas when the processing loop is not terminated ("N" in 013), the processing loops back to the process of 010.

In the process of 014, the CPU 61 determines based on results of the processes in the processes 011 and 012 whether there is the neighboring microcell as a candidate for the HO or not. Herein, when there is no neighboring microcell for the HO candidate ("N" in 014), this sub-process is finished. This is because of there being a possibility of cutting off the communication service from the terminal 5 upon setting OFF the selected cell due to disabling the subordinate terminal 5 under the selected cell from handing over to the macrocell 1 and the neighboring microcell from the selected cell. Whereas when there is the neighboring microcell as the HO candidate ("Y" in 014), the processing advances to 015.

In the process of 015, the microcell control unit 71B of the control unit 71 transmits a message containing an OFF request (to indicate transmission power-OFF) of the selected cell to the microcell base station 4 configuring the selected cell. The microcell base station 4 receives the OFF request, whereby the transmission power is switched OFF (0) and the selected cell is set OFF.

In the process of 016, the control unit 71 sets the ON/OFF status of the selected cell to the OFF status in the table 87. In a process of 017, the control unit 71 decrements the data flow rate and the user count of the selected cell (set to "0").

In a process of 018, the control unit 71 adds the data flow rate and the user count each decremented in step 017 to the HO target cell (the macrocell 1 or the neighboring microcell) in the table 87. Note that a plurality of neighboring microcells becoming the HO candidates is detected in the processes of 011 and 012, in which case one neighboring microcell is selected by, e.g., a predetermined method, and the data flow rate and the user count of this selected neighboring microcell are incremented.

In a process of 019, the control unit 71 determines whether the processing on all of the microcells 3 in the table 87 is finished or not. When the processing is finished ("Y" in 019), this sub-process is ended. Whereas when the process is not finished, the processing loops back to the process of 001.

The microcell OFF sub-process involves, when there is the macrocell 1 or the neighboring microcell enabled to receive the traffic of the terminal 5 kept in communication via the microcell 3, determining to set OFF this microcell 3 and setting OFF the selected cell upon receiving the OFF request. Power consumption of the microcell base station 4 is thereby reduced.

Note that the foregoing determinations in the processes of 003 and 004 may be made based on whether equal to or larger than the lower limit threshold value. The determinations in the processes of 005, 006, 012 and 012 may be made based on whether equal to or larger than the threshold value. The processes of 003 and 004, the processes of 005 and 006 and the processes of 011 and 012 may be reversed in order as the case may be.

[Microcell ON Sub-Process]

Figure 27:
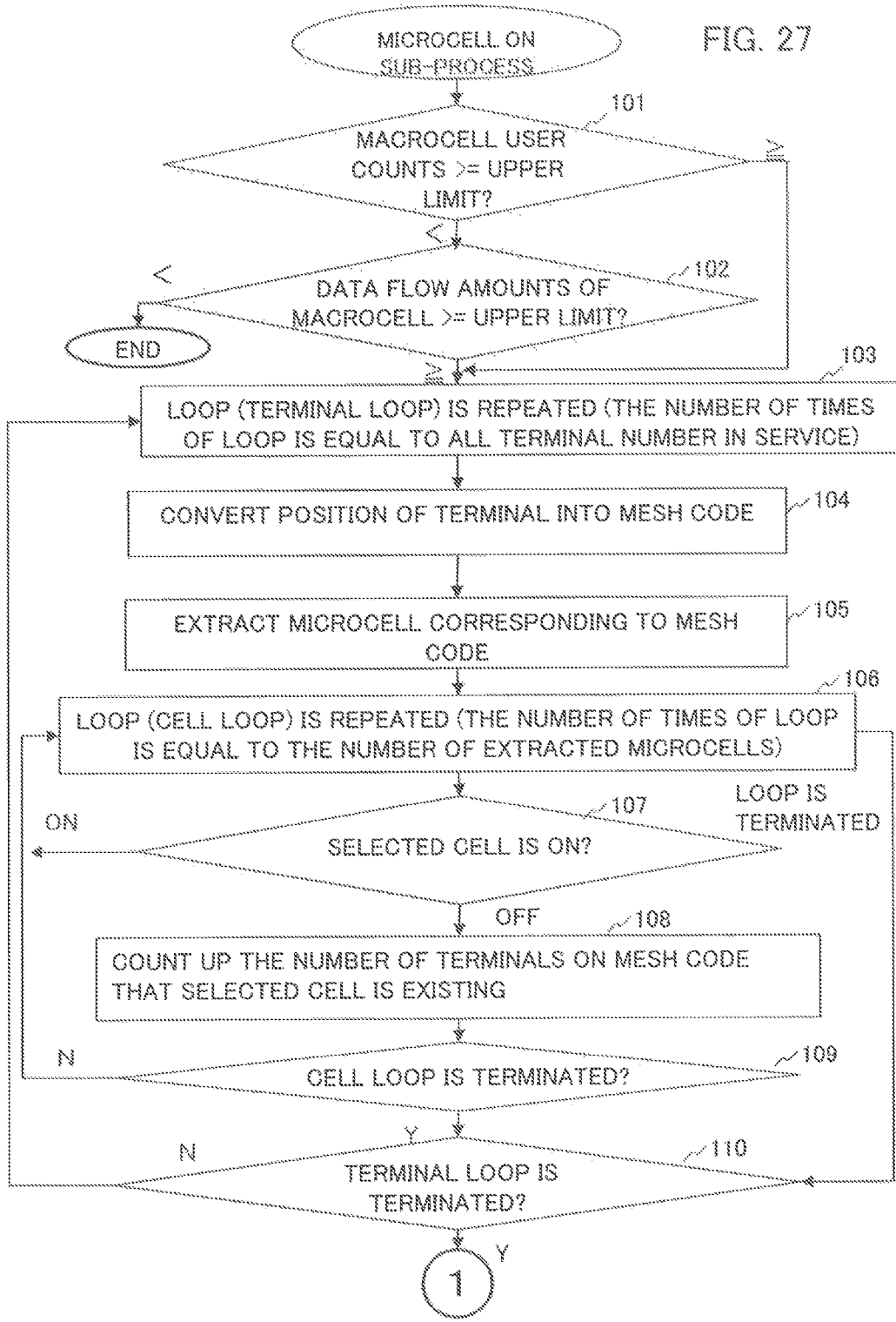
FIG. 27 is a flowchart illustrating one example of the microcell ON sub-process ((4) in FIG. 21)
Figure 28:
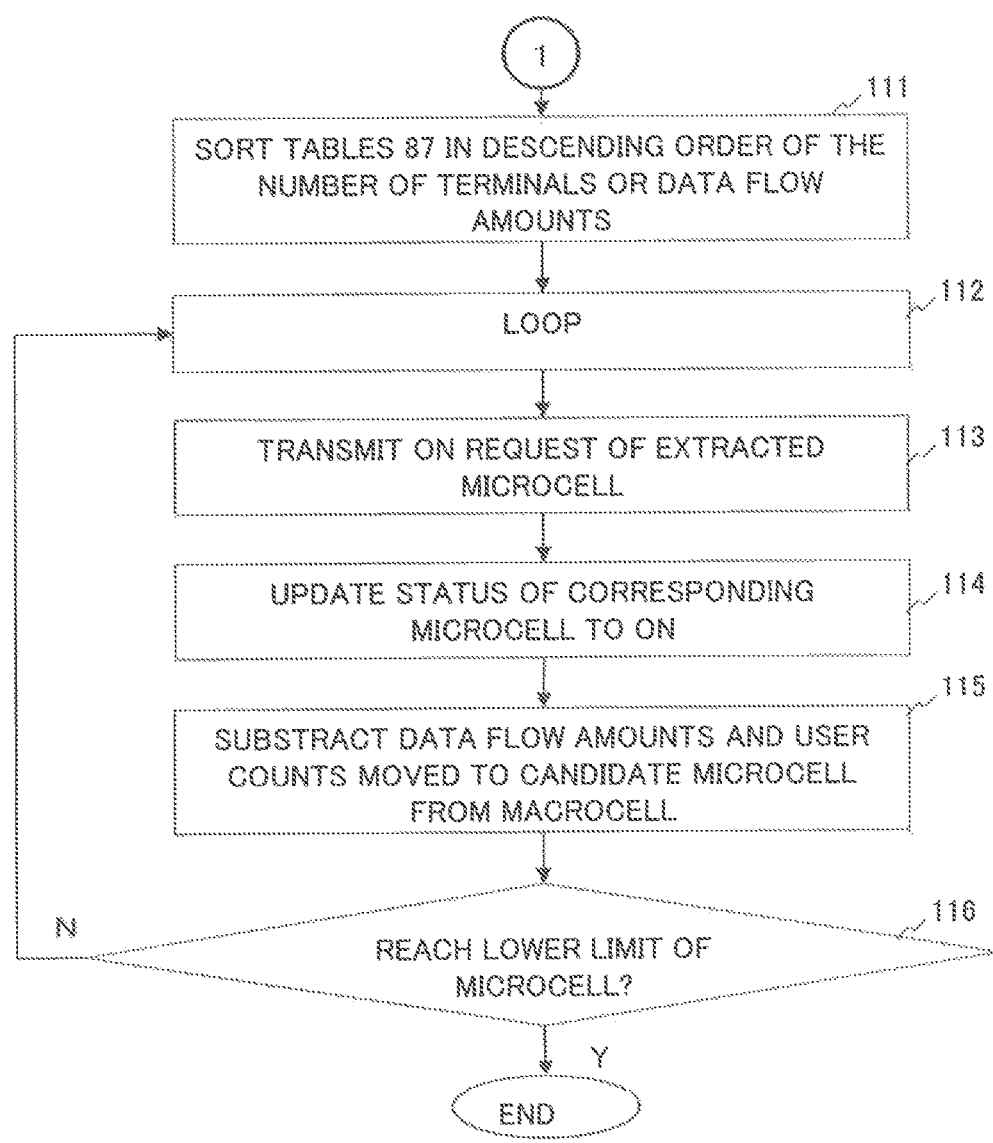
FIG. 28 is a flowchart illustrating one example of the microcell ON sub-process ((4) in FIG. 21)

FIGS. 27 and 28 are flowcharts each illustrating one example of a microcell on sub-process ((4) in FIG. 21). FIG. 29 illustrates one example of the microcell ON/OFF management table 87. FIG. 30 depicts one example of a part (a record of the macrocell 1) of the traffic information management table 80 per base station. Processes in FIGS. 27 and 28 are executed by the control unit 71, the analyzing unit 73, the analyzing unit 74 and the determining unit 75 in cooperation as the functions of the CPU 61. Hence, these processes are described as the processes of the CPU 61.

The CPU 61 of the server 6 refers to the records (FIG. 29) of the macrocell (M cell) 1 in the table 80 in first step 101 of FIG. 27. The CPU 61 compares the user count of the macrocell 1 with the upper limit threshold value (e.g.: 100 users) of the user count in the table 85 (FIG. 18). Herein, when the user count is equal to or larger than the upper limit threshold value ("≥" in 101), the CPU 61 advances the processing to step 103 under an assumption of the macrocell 1 being in congestion. Whereas when the user count is smaller than the upper limit threshold value ("<" in 101), the CPU 61 advances the processing to 102.

In the process of 102, the CPU 61 compares the data flow rate of the macrocell 1 in the table 80 with the upper limit threshold value (e.g.: 800 Mbps) of the data flow rate in the table 85. Herein, when the data flow rate is equal to or larger than the upper limit threshold value ("≥" in 101), the CPU 61 advances the processing to step 103 under the assumption of the macrocell 1 being in congestion. Whereas when the user count is smaller than the upper limit threshold value ("<" in 101), the CPU 61 finishes this sub-process. This is because of there being an allowance in resources (receivable user count, frequency band).

In the process of 103, the CPU 61 executes the loop processing in the processes of 104-110 (called an terminal loop) targeting on all of the terminals 5 in communication while visiting the macrocell 1. To be specific, the pieces of position information of the target terminals 5 are converted into the mesh codes in the process of 104. The conversion may be performed by using the table 83 (FIG. 15). Alternatively, the conversion may also be conducted by employing the tables 83 and 84.

In the process of 105, the CPU 61 extracts the microcells (μ cells) 3 associated with the mesh codes. The extraction is made by using the table 81 (FIG. 13). For example, the μ cells "μ4" and "μ8" are extracted as the microcells 3 associated with the mesh code "603", and the μ cell "μ4" is extracted as the μ cell 3 associated with the mesh code "403" (see FIG. 29).

In the process of 106, the CPU 61 selects one of the extracted microcells 3 (the cell selected is called "the selected cell"), and executes the loop processing in steps 107-109 (termed "a cell loop").

In the process of 107, the CPU 61 refers to the table 87 (FIG. 28) and thus determines whether the selected cell is already set ON or not. Herein, when the selected cell is set ON ("ON" in 107), the processing loops back to 106, to select the next microcell 3. Note that when there is no microcell 3 to be selected, the cell loop is ended, and the processing advances to 110. Whereas when the selected cell is OFF ("OFF" in 107), the processing advances to 108.

In the process of 108, the CPU 61 counts up the user count by "1" in the mesh code associated with the selected cell in the table 87. It is because the base station is assumed to be handed over to the selected cell from the macrocell 1 by setting ON the selected cell. Thereafter, the processing advances to 109.

In the process of 109, the CPU 61 determines whether the cell loop is ended or not. In other words, the CPU 61 determines whether the processing on all of the microcells 3 extracted in step 105 is finished or not. When the cell loop is terminated ("Y" in 109), the processing advances to 110. Whereas when the cell loop is not terminated ("N" in 109), the processing loops back to 106.

In the process of 110, the CPU 61 determines whether the terminal loop is terminated or not. In other words, the CPU 61 determines whether the processing on all of the terminals 5 in communication under the macrocell 1 is finished or not. When the terminal loop is terminated ("Y" in 110), the processing advances to 111 (FIG. 28). Whereas when the terminal loop is notenot ("N" in 110), the processing loops back to step 103.

In the process of 111, the CPU 61 sorts the microcells 3 extracted in step 105 in sequence from the largest of the data flow rate or the largest of the user count in the table 87. The sorting is not, however, indispensable.

Subsequently, the CPU 61 selects one of the microcells 3 in sequence from above targeting on the microcells 3 extracted in the process of 105, and executes the following process (112). To be specific, in the process of 113, the CPU 61 transmits a message containing a request for setting ON the microcell 3 selected in the process of 112 to the microcell base station 4 configuring this microcell 3. The microcell base station 4 receiving the message sets ON the microcell 3 (i.e., switches ON the transmission power).

In the process of 114, the CPU 61 updates the table 87 by setting the status of the microcell 3 selected in the process of 112 to the ON status. In the process of 115, the CPU 61 decrements, from the table 80 (FIG. 30), the data flow rate and the user count of the cell scheduled to migrate (hand over) to the microcell 3 selected in step 112 from the macrocell 1.

In the process of 116, the CPU 61 determines whether or not at least one of the data flow rate and the user count of the macrocell 1 decreases under the lower limit threshold value. Herein, when not decreasing under the lower limit threshold value ("N" in 116), the processing loops back to step 112. Then, the processing is carried out from step 113 onward with respect to the next microcell 3. Whereas when decreasing under the lower limit threshold value ("Y" in 116), the processing exists the loop, resulting an end of this sub-process. It is because the congestion of the macrocell 1 is assumed to be obviated owing to the handover of (the base station for) the terminal 5 to the microcell 3.

The microcell ON sub-process involves, when the macrocell 1 is congested, deducing the microcell 3 in which the terminal 5 subordinate to the macrocell 1 is located by use of the mesh, and setting ON the deduced microcell 3. This contrivance enables anticipation of the handover to the microcell 3 from the macrocell 1 and the obviation of the congestion of the macrocell 1.

<<Operational Example 2>>

Figure 31:
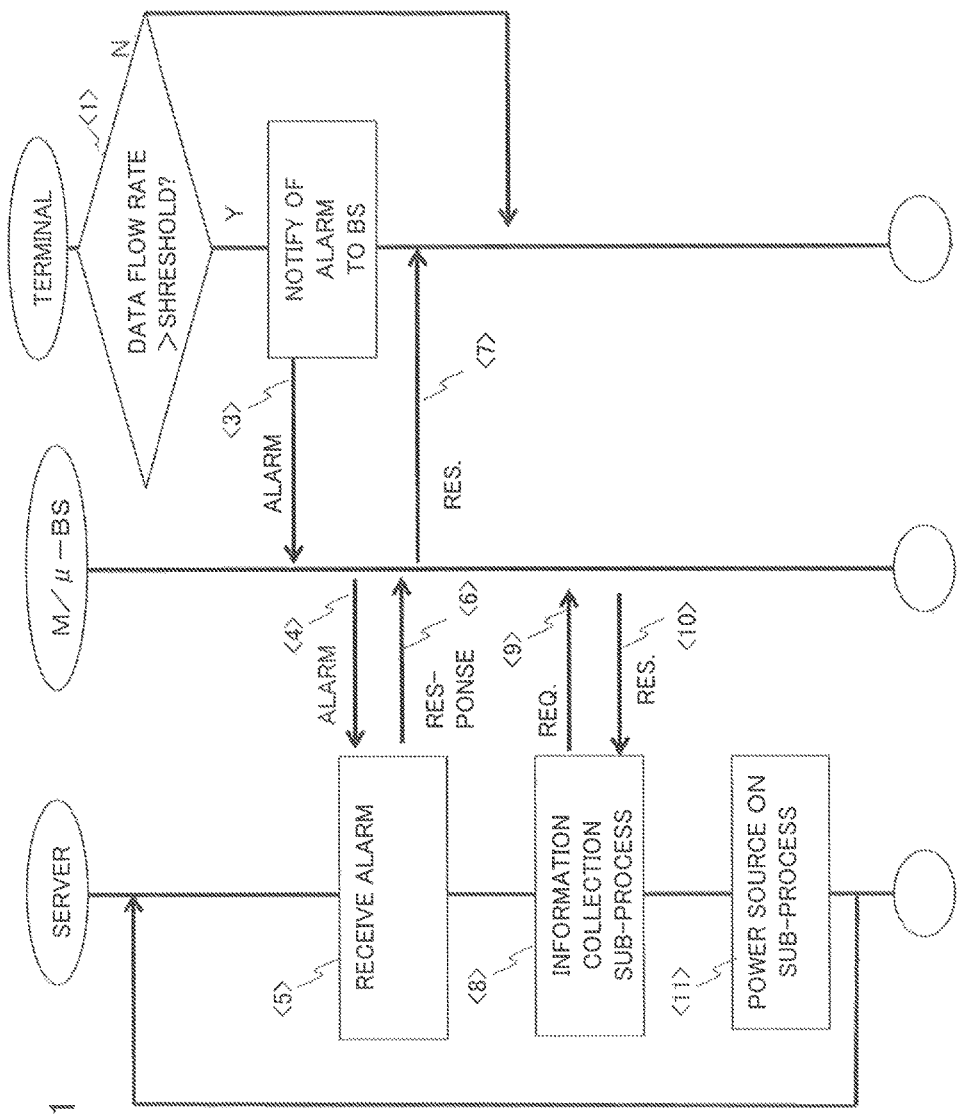
FIG. 31 is a diagram illustrating an operational example (one example of an alarm process of a server 6)

An operational example will be described as an operational example 2, the example being related to the ON control of the microcell 3 by the server 6 monitoring the alarms of the macrocell base station 2 and the microcell base station 4. FIG. 31 is a diagram illustrating one example of an alarm process of the server 6.

In FIG. 31, the CPU 14 (control unit 21') of each terminal 5 determines whether the data flow rate to be measured periodically exceeds the threshold value or not (<1>). When the data flow rate does not exceed the threshold value ("N" in <1>), notification of the alarm is not made. Whereas when the data flow rate exceeds the threshold value ("Y" in <1>), the CPU 14 of the terminal 5 transmits the alarm to the base station (the macrocell base station 2 or the microcell base station 4) connected to the terminal 5 (<2>).

The "excess of the threshold value" includes an instance of the data flow rate decreasing under (or being equal to or smaller than) the lower limit threshold value and an instance of the data flow rate increasing above (or being equal to or larger than) the upper limit threshold value. The instance of decreasing under the lower limit threshold value leads to an assumption that a wireless environment between the base station and the terminal 5 worsens. The instance of increasing above the upper limit threshold value leads to an assumption of such a state that another terminal 5 cannot ensure a sufficient frequency band due to an excessive augmentation of the communication frequency band between the base station and the terminal 5. However, the determination of any one of the lower limit threshold value and the upper limit threshold value may be made as the case may be.

The alarm is transferred to the server 6 via the base station (<3>, <4>). The server 6, upon receiving the alarm (<5>), transmits a message in response to the alarm (<6>). The response message is sent to the terminal 5 via the base station (<7>).

The server 6 receiving the alarm executes an information collection sub-process targeting on the cell (the macrocell 1, the microcell 3 visited by the terminal 5 issuing the alarm (<8>). Thereafter, the server 6 executes the microcell ON sub-process (<9>).

[Information Collection Sub-Process]

Figure 32:
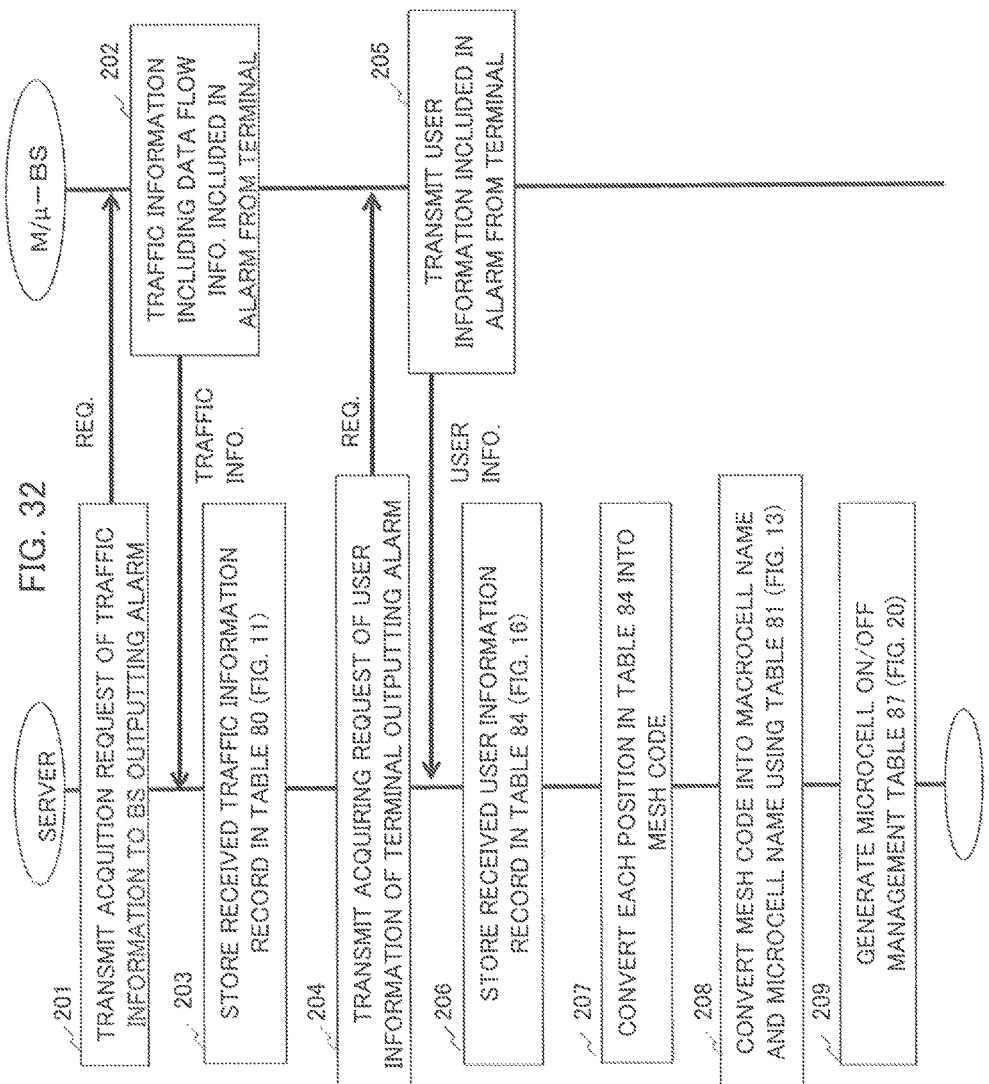
FIG. 32 is a diagram illustrating one example of an information collection sub-process in the operational example 2.

FIG. 32 is a diagram illustrating one example of an information collection sub-process in the operational example 2. Processes of 201-209 depicted in FIG. 32 are substantially the same as the processes of 01-09 of the operational example 1 illustrated in FIG. 22. In the operational example 2, however, only the base station of the macrocell 1 or the microcell 3, in which the terminal 5 issuing the alarm is located, is requested to provide the traffic information and the user information. Other points being the same as those of the operational example 1, the explanations thereof are omitted.

[Microcell ON Sub-Process]

Figure 33:
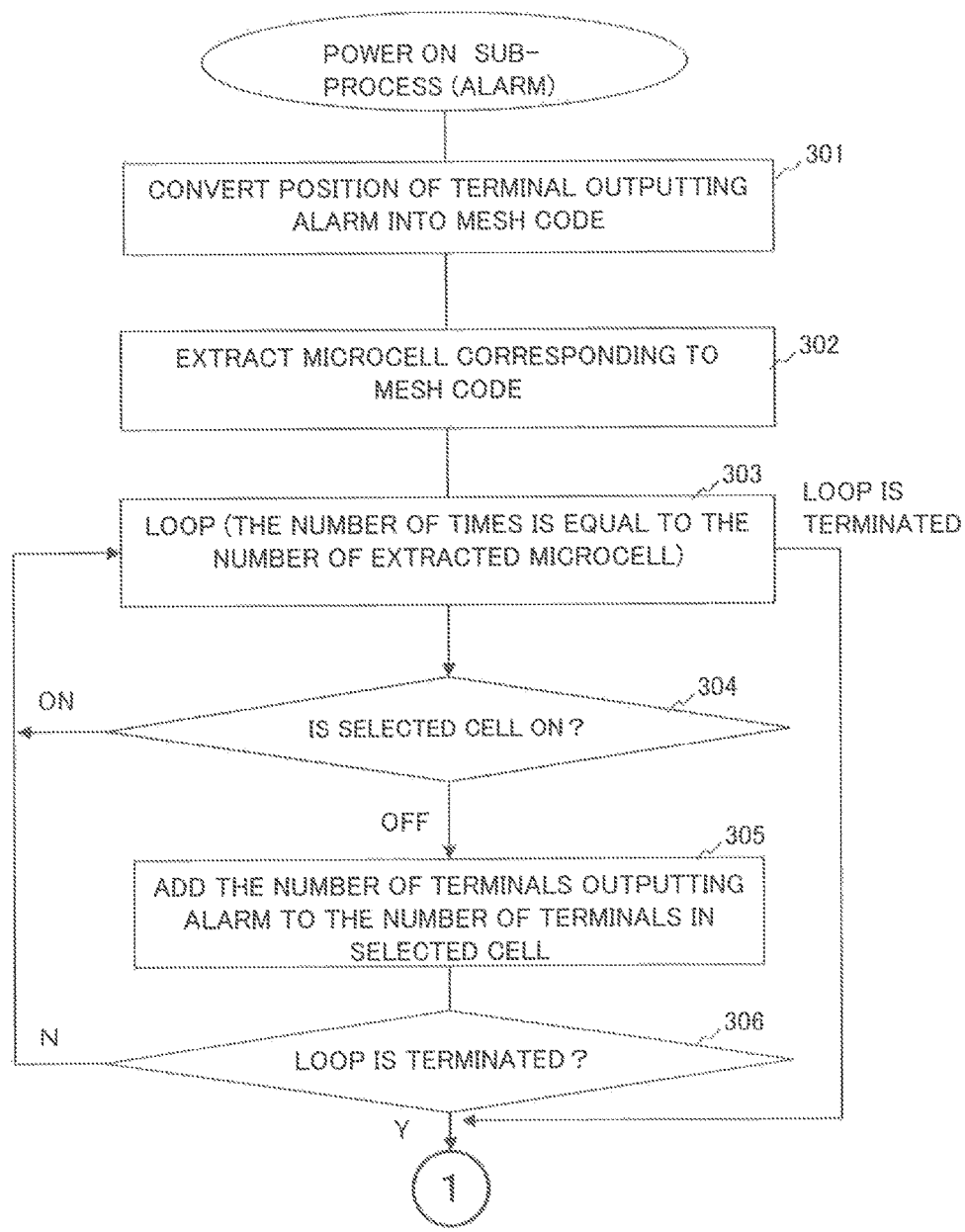
FIG. 33 is a flowchart illustrating one example of the microcell ON sub-process (<11> in FIG. 31) in the operational example 2.
Figure 34:
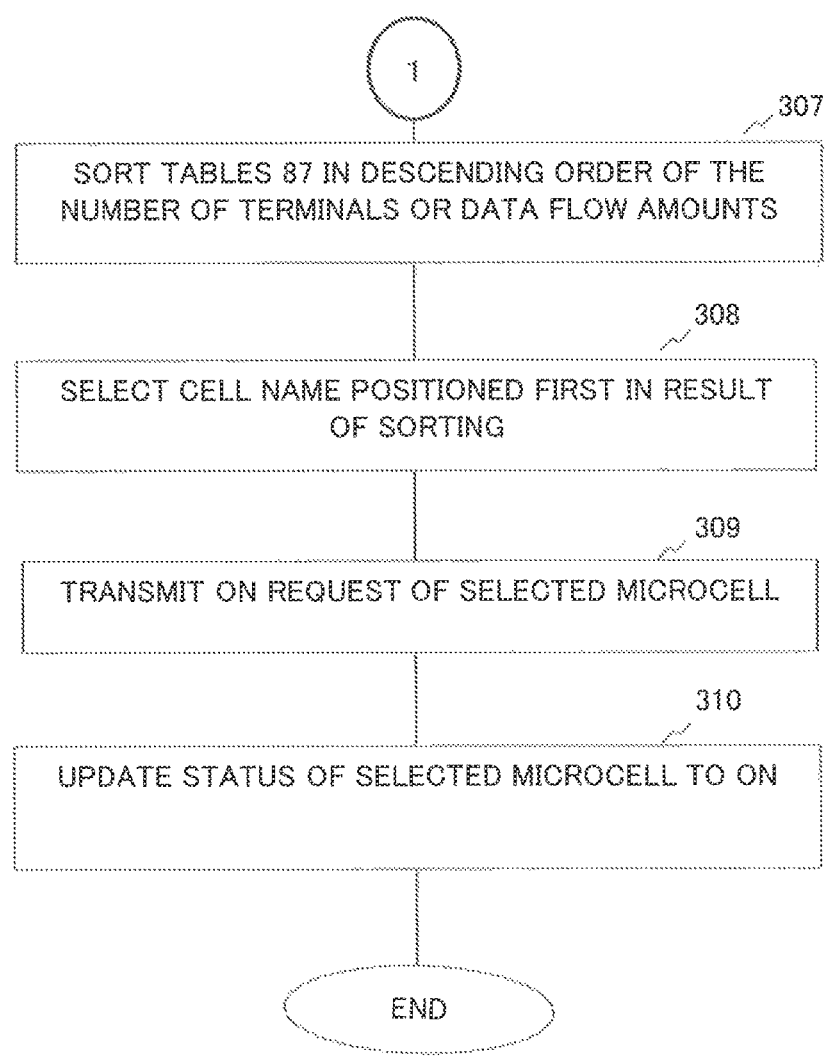
FIG. 34 is a flowchart illustrating one example of the microcell ON sub-process (<11> in FIG. 31) in the operational example 2.

FIGS. 33 and 34 are flowcharts each illustrating one example of the microcell OFF (ON) sub-process in the operational example 2 (<11> in FIG. 31). Processes of 301-310 depicted in FIGS. 33 and 34 are executed targeting on the terminal 5 issuing the alarm. Contents of the processes of 301-310 being substantially the same as those processes of 104-109 and processes 111-114 illustrated in FIGS. 27 and 28, the explanations thereof are omitted.

The operational example 2 enables such anticipation that the terminal 5 issuing the alarm hands over to another microcell 3 by setting ON another microcell 3 neighboring to the cell to which the terminal 5 issuing the alarm belongs. With this contrivance, it is feasible to improve the communication environment for the terminal 5 issuing the alarm. It is also possible to improve the communication environment for the remaining terminals 5 through the migration of the terminal 5 issuing the alarm to another microcell 3.

Note that the operational example 2 has exemplified the instance of using the data flow rate as the information (parameter) used for the determination about the occurrence of the alarm. However, the radio quality may be applied in place of or in addition to the data flow rate.

<<Operational Example 3>>

The microcell ON sub-process with a trigger of scheduling will be described as an operational example 3. Processes of the operational example 3 are executed in parallel to the periodic monitoring in the operational example 1. The operational example 3 maybe implemented by using the periodic monitoring related information obtained in the information collection sub-process, at least the table 87 and the table 8.

Figure 35:
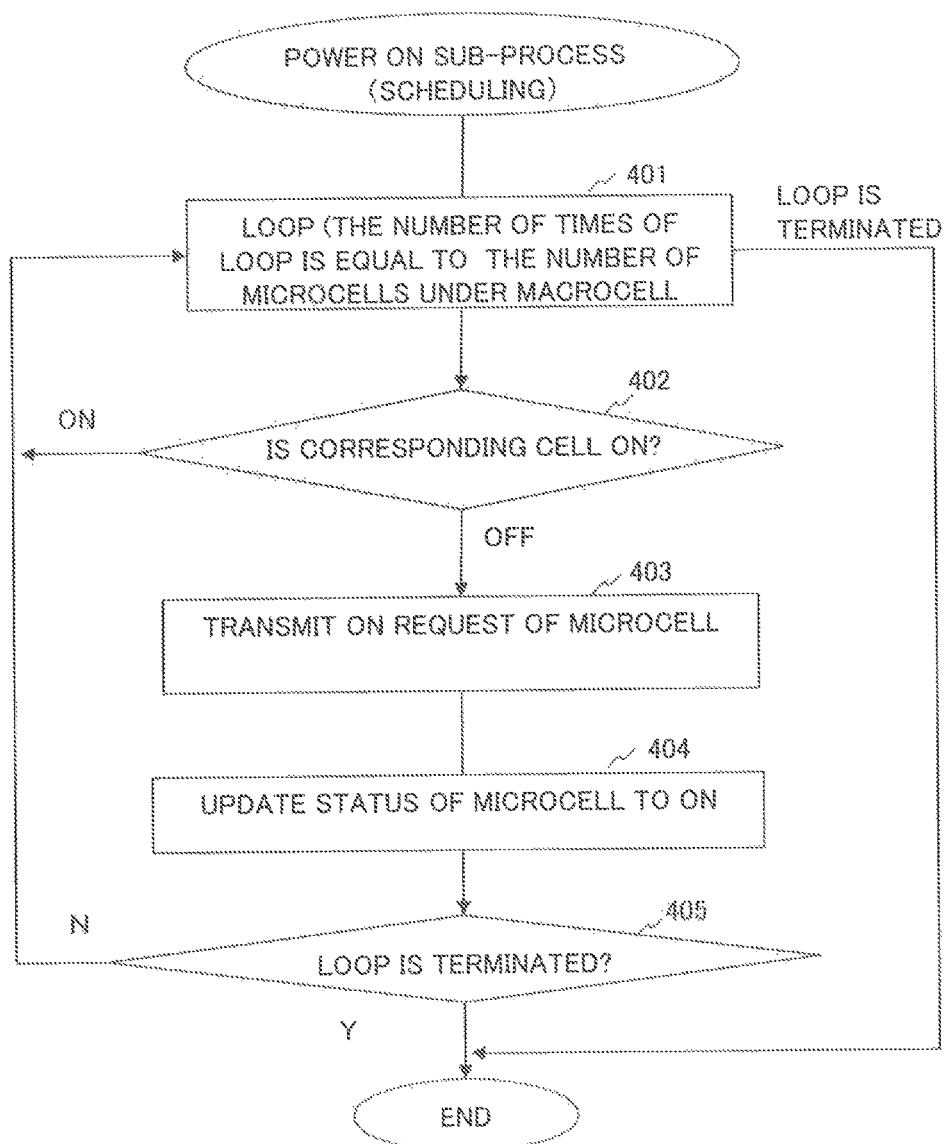
FIG. 35 is a flowchart illustrating one example of a microcell ON sub-process according to the schedule management table (FIG. 19).

FIG. 35 is a flowchart illustrating one example of the microcell ON sub-process according to the schedule management table 86 (FIG. 19). Processes illustrated in FIG. 35 are started at proper timing adjusted to, e.g., event start time registered in the table 86. In a process of 401, the CPU 61 specifies the macrocell 1 registered in the record and affected by a target event etc., and executes the processes from step 402 onward with respect to each of the microcells 3 (subordinate to the macrocell 1) within the specified macrocell 1.

The CPU 61 selects one of the microcells 3, in the process of 401 and determines whether the microcell 3 selected in a process of 402 is ON or OFF. When the selected microcell 3 is OFF, the CPU 61 transmits an ON request message of this microcell 3 to the microcell base station 4 configuring the microcell 3 (403). The CPU 61 sets the microcell 3 in the ON status in the table 87 (404). In a process of 405, the CPU 61 determines whether the processing is executed on all of the target microcells 3 or not. When the processing to be executed on all of the target microcells 3 is finished, the sub-process is ended. Whereas when not, the processing loops back to the process of 401. Note that as described above, the server 6, with the periodic monitoring process time belonging to a period of time of the event etc., does not set OFF the small cell even when the small cell OFF condition is satisfied.

The operational example 3 enables the subordinate microcell 3 to be set ON adjusting to the period of time with anticipation of a rise of the congestion or load of the macrocell 1 due to the event etc., and enables an attempt of increasing the receivable user count and the frequency band.

<Effect of Embodiment>

According to the embodiment, the server 6 adds the value (the data flow rate, the user count in communication) indicating the traffic state of the terminal 5 using the microcell 3 to the value (the data flow rate, the user count in communication) indicating the traffic state of the terminal 5 using the macrocell 1. Herein, when not exceeding the upper limit threshold value determined with respect to the macrocell 1 (when falling within a predetermined range), the server 6 executes the process of setting OFF the microcell 3 (transmitting the OFF request message).

The microcell 3 being thus set OFF, the power consumption of the microcell base station 4 is reduced. The microcell 3 is set OFF in a state enabling each subordinate terminal 5 under the microcell 3 to hand over (HO) to the macrocell 1 or the neighboring microcell 3. Each terminal 5 may therefore continue the communications through the HO. In other words, an interruption of the communication service may be avoided.

The microcell OFF sub-process in the operational example 1 is executed at the periodic monitor timing. When the data flow rate and the user count in a certain microcell 3 exceed the upper limit threshold values, it is determined whether the microcell 3 is set OFF. The microcell 3 being set OFF through such determinations based on the threshold values, a monitoring load on an operator (a network administrator) is reduced.

According to the microcell ON sub-process in the operational example 1, when the traffic state (the data flow rate, the user count in communication) of the macrocell 1 exceeds the upper limit threshold value, the microcell 3 enabled to receive the terminal 5 subordinate to the macrocell 1 is set ON based on the position information of the terminal 5. The congestion (high load status) of the macrocell 1 may be therefore obviated.

According to the operational example 2, another microcell 3 is set ON, which corresponds to the neighboring cell to the microcell 3 visited by the terminal 5 issuing the alarm. Hence, the terminal 5 migrates to the neighboring cell through the handover, thereby enabling the improvement of the communication environment for the terminal 5 and the improvement of the communication environment for other terminals staying in the microcell 3.

According to the operational example 3, the microcell 3 in the OFF status may be automatically set in the ON status in accordance with the schedule information of the event etc. The monitoring load on the operator is thereby reduced, and the load on the macrocell 1 during the event etc. may be thereby relieved.

<Modified Example>

The position information of the terminal 5 may be measured by the base station or another apparatus. The data flow rate may also be measured by each of the base stations 2 and 4 as a substitute for the terminal 5. The OFF request message and the ON request message may also be transmitted to the target base station from the apparatus other than the server 6. The server 6 may also receive at least one of the traffic information and the user information from an apparatus exclusive of the base station. The configurations of the embodiments discussed above may be properly combined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless network control system, comprising:
    a macrocell base station configured to form a macrocell;
    at least one small cell base station configured to form a small cell disposed within the macrocell; and
    a control apparatus including a controller configured to execute a process of acquiring a first value including a data flow rate of the macrocell and a number of wireless terminals in communication using the macrocell and a second value including a data flow rate of the small cell and a number of wireless terminals in communication using the small cell, and a process of setting OFF the small cell when an added value of the data flow rate included in the first value and the data flow rate included in the second value does not exceed an upper limit threshold thereof and an added value of the number of wireless terminals included in the first value and the number of wireless terminals included in the second value does not exceed an upper limit threshold thereof.

2. The wireless network control system according to claim 1, wherein the controller is configured to execute a process of setting OFF the small cell when an added value of a data flow rate of a neighboring small cell, which is another small cell in an area where the small cell is in, and a data flow rate of the small cell does not exceed an upper limit threshold thereof and an added value of a number of wireless terminals in communication using the neighboring small cell and a number of wireless terminals in communication using the small cell does not exceed an upper limit threshold thereof.

3. The wireless network control system according to claim 2, wherein the controller is configured to execute a process of adding the data flow rate of the neighboring small cell and the data flow rate of the small cell and adding the number of wireless terminals in communication using the neighboring small cell and the number of wireless terminals in communication using the small cell when at least one of the data flow rate and the number of wireless terminals of the small cell does not fall within a predetermined range related to the small cell.

4. The wireless network control system according to claim 2, wherein the area is one of small areas that is formed by division of a large area including a coverage area of the macrocell, a coverage area of the small cell and a coverage area of the another small cell overlapping with the one of small areas.

5. The wireless network control system according to claim 1, wherein the controller is configured to execute a process of adding the data flow rate included in the first value and the data flow rate included in the second value and adding the number of wireless terminals included in the first value and the number of wireless terminals included in the second value when at least one of the data flow rate and the number of wireless terminals included in the second value of the small cell does not fall within a predetermined range related to the small cell.

6. The wireless network control system according to claim 1, wherein the controller is configured to execute a process of setting ON a small cell in an OFF status when at least one of the data flow rate of the macrocell and the number of wireless terminals of the macrocell exceeds an upper limit threshold related to the macrocell, wherein the small cell that is set ON has a coverage area covering at least one terminal in communication using the macrocell.

7. The wireless network control system according to claim 1, wherein the controller is configured to execute a process of setting ON a small cell in an OFF status when receiving an alarm, which indicates that the data flow rate of the macrocell exceeds an upper limit threshold, from a wireless terminal in communication using the macrocell, wherein the small cell that is set ON has a coverage area covering the wireless terminal of transmission origin of the alarm.

8. The wireless network control system according to claim 1, wherein the controller is configured to perform control to set ON a small cell based on information indicating a period of time that increase of a traffic demand for the macrocell is predicted.

9. A control apparatus of a wireless network including a macrocell base station to form a macrocell, and at least one small cell base station to form a small cell deployed within the macrocell, the apparatus comprising:
    a controller configured to execute a process of acquiring a first value including a data flow rate of the macrocell and a number of wireless terminals in communication using the macrocell and a second value including a data flow rate of the small cell and a number of wireless terminals in communication using the small cell, and a process of setting OFF the small cell when an added value of the data flow rate included in the first value and the data flow rate included in the second value does not exceed an upper limit threshold thereof and an added value of the number of wireless terminals included in the first value and the number of wireless terminals included in the second value does not exceed an upper limit threshold thereof.

10. A control method of a wireless network including a macrocell base station to form a macrocell, and at least one small cell base station to form a small cell disposed within the macrocell, the method comprising:

acquiring, using a processor, a first value including a data flow rate of the macrocell and a number of wireless terminals in communication using the macrocell and a second value including a data flow rate of the small cell and a number of wireless terminals in communication using the small cell; and executing, using the processor, a process of setting OFF the small cell when an added value of the data flow rate included in the first value and the data flow rate included in the second value does not exceed an upper limit threshold thereof and an added value of the number of wireless terminals included in the first value and the number of wireless terminals included in the second value does not exceed an upper limit threshold thereof.

* * * * *